US011533755B2

(12) United States Patent
Chitrakar et al.

(10) Patent No.: US 11,533,755 B2
(45) Date of Patent: Dec. 20, 2022

(54) COMMUNICATION APPARATUS AND COMMUNICATION METHOD

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 225 days.

(21) Appl. No.: 16/285,965

(22) Filed: Feb. 26, 2019

(65) Prior Publication Data

US 2019/0200387 A1 Jun. 27, 2019

Related U.S. Application Data

(63) Continuation of application No. PCT/JP2017/038433, filed on Oct. 25, 2017.

(30) Foreign Application Priority Data

Nov. 4, 2016 (JP) .............................. JP2016-216622
Mar. 2, 2017 (JP) .............................. JP2017-039514

(51) Int. Cl.
*H04W 74/08* (2009.01)
*H04W 28/20* (2009.01)
(Continued)

(52) U.S. Cl.
CPC ....... *H04W 74/0816* (2013.01); *H04W 28/20* (2013.01); *H04W 48/12* (2013.01); *H04W 84/12* (2013.01)

(58) Field of Classification Search
CPC . H04W 74/0816; H04W 28/20; H04W 48/12; H04W 84/12; H04W 72/0446;
(Continued)

(56) References Cited

U.S. PATENT DOCUMENTS 9,698,947 B2 * 7/2017 Kwon .................. H04L 5/0007
9,788,317 B2 * 10/2017 Ghosh .................. H04L 5/0092
(Continued)

FOREIGN PATENT DOCUMENTS

WO 2016/139859 A1 9/2016

OTHER PUBLICATIONS

International Search Report of PCT application No. PCT/JP2017/038433 dated Nov. 28, 2017.
(Continued)

*Primary Examiner* — Gregory B Sefcheck
*Assistant Examiner* — Joshua Smith
(74) *Attorney, Agent, or Firm* — Seed IP Law Group LLP

(57) ABSTRACT

The communication apparatus comprises a receiver which, in operation, receives a PHY layer Data Unit that includes a duration field; Physical (PHY) layer circuitry which, in operation, issues a PHY-CCA (clear channel assessment) primitive parameter indicating bandwidth information on a busy or idle state for each subchannel within an operating bandwidth; and Media Access Control (MAC) circuitry which, in operation, updates a Network Allocation Vector (NAV) value based on the duration information and, in operation, determines busy/idle state of at least one subchannel, wherein the MAC circuitry, in operation, controls transmission of the HE TB PHY layer Data Unit based on the updated NAV value and the busy/idle state of the at least one subchannel, and controls the PHY circuitry to have the HE TB PHY layer Data Unit transmitted when the at least
(Continued)

one subchannel is considered idle, regardless of whether the primary subchannel is busy or not.

7 Claims, 35 Drawing Sheets

(51) Int. Cl.
*H04W 48/12* (2009.01)
*H04W 84/12* (2009.01)

(58) Field of Classification Search
CPC ............. H04W 72/0453; H04W 72/08; H04W 72/044; H04W 72/085; H04W 4/42; H04L 5/0005; H04L 5/0044; H04B 2001/7154; H04B 1/715
See application file for complete search history.

(56) References Cited

U.S. PATENT DOCUMENTS

| | | | | |
|---|---|---|---|---|
| 2007/0072638 A1* | 3/2007 | Yang | ..................... | H04W 52/50 455/522 |
| 2010/0054214 A1* | 3/2010 | Igarashi | ............ | H04W 52/0216 370/336 |
| 2011/0116401 A1* | 5/2011 | Banerjea | ........... | H04W 74/0816 370/252 |
| 2013/0301569 A1* | 11/2013 | Wang | .................... | H04L 1/1854 370/329 |
| 2015/0319747 A1* | 11/2015 | Chu | .................... | H04L 27/2602 370/330 |
| 2016/0212246 A1* | 7/2016 | Seok | ....................... | H04L 69/22 |
| 2016/0219522 A1* | 7/2016 | Asterjadhi | ........ | H04W 28/0221 |
| 2016/0255656 A1* | 9/2016 | Lou | ........................ | H04L 1/1685 370/335 |
| 2017/0006609 A1* | 1/2017 | Adachi | .................... | H04L 69/22 |
| 2017/0064708 A1* | 3/2017 | Noh | ....................... | H04L 5/0023 |
| 2017/0347376 A1* | 11/2017 | Sakai | ................ | H04W 74/0825 |
| 2018/0007633 A1 | 1/2018 | Mori et al. | | |
| 2018/0324859 A1* | 11/2018 | Kim | ....................... | H04W 12/06 |

OTHER PUBLICATIONS

IEEE 802.11-15/0132r17, "Specification Framework for TGax", May 25, 2016.
IEEE Std 802.11 (TM)—2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.
IEEE 802.11-16/0024r1, "Proposed TGax draft specification", Mar. 2, 2016.
IEEE 802.11-16/0054r1, "UL MU CCA Response", Jan. 19, 2016.
IEEE 802.11-17/0336r0, "Comment Resolution on Virtual CS", Mar. 7, 2017.
IEEE 802.11-17/0337r0, "Virtual CS during UL MU", Mar. 7, 2017.

* cited by examiner

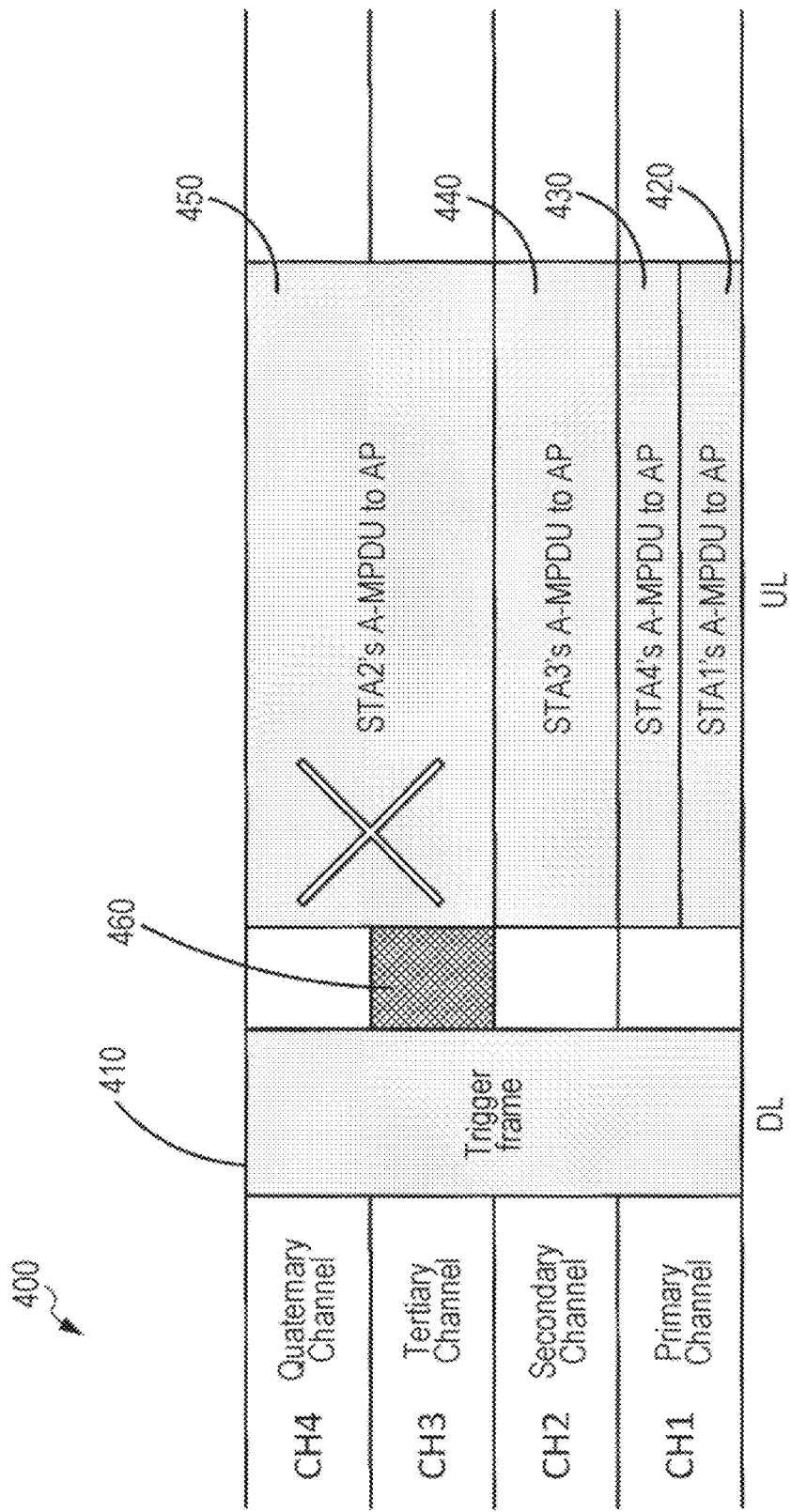

FIG. 6

| OBSS CH State | CH# | STA2 | | | | |
|---|---|---|---|---|---|---|
| | | intra-BSS NAV | basic NAV | Virtual CS | CCA-ED result | UL MU CS |
| - | CH4 | 0 | > 0* | Busy | Idle | Busy |
| - | CH3 | | | | Idle | Busy |
| Busy | CH2 | | | | Busy | Busy |
| Busy | CH1 | | | | Busy | Busy |

FIG. 8B

| OBSS CH State | CH# | intra-BSS NAV | basic NAV | | Virtual CS | CCA-ED result | UL MU CS |
|---|---|---|---|---|---|---|---|
| | | | Duration | BW | | | |
| - | CH4 | 0 | > 0* | Idle | Idle | Idle | Idle |
| - | CH3 | | | Idle | Idle | Idle | Idle |
| Busy | CH2 | | | Busy | Busy | Busy | Busy |
| Busy | CH1 | | | Busy | Busy | Busy | Busy |

STA2

FIG. 12

| PHY-CCA.INDICATION PRIMITIVE CHANNEL-LIST ELEMENT | IDLE CHANNELS |
|---|---|
| primary | NONE |
| secondary | PRIMARY 20 MHz CHANNEL |
| secondary40 | PRIMARY 20 MHz CHANNEL AND SECONDARY 20 MHz CHANNEL |
| secondary80 | PRIMARY 20 MHz CHANNEL, SECONDARY 20 MHz CHANNEL, AND SECONDARY 40 MHz CHANNEL |
| primary20 | CHANNELS OTHER THAN THE PRIMARY 20 MHz CHANNEL |
| primary40 | CHANNELS OTHER THAN THE PRIMARY 40 MHz CHANNEL |
| primary80 | SECONDARY 80 MHz CHANNEL |

FIG. 20

| PPDU FORMAT | CHANNEL BANDWIDTH INFORMATION |
|---|---|
| HE PPDU | THE CH_BANDWIDTH PARAMETER OF THE RXVECTOR INDICATES THE BANDWIDTH OF THE RECEIVED PPDU. THE CH_BANDWIDTH PARAMETER IS IN TURN BASED ON THE BANDWIDTH FIELD IN THE HE-SIG-A. |
| VHT PPDU | THE CH_BANDWIDTH PARAMETER OF THE RXVECTOR INDICATES THE BANDWIDTH OF THE RECEIVED PPDU. THE CH_BANDWIDTH PARAMETER IS IN TURN BASED ON THE BW FIELD IN THE VHT-SIG-A1 |
| HT PPDU | THE CH_BANDWIDTH PARAMETER OF THE RXVECTOR INDICATES THE BANDWIDTH OF THE RECEIVED PPDU. THE CH_BANDWIDTH PARAMETER IS IN TURN BASED ON THE CBW 20/40 bit IN THE HT-SIG. |
| non-HT PPDU | IF THE NON_HT_MODULATION PARAMETER IS OFDM, THE CHANNEL BANDWIDTH IS 20 MHz. IF THE NON_HT_MODULATION PARAMETER IS NON_HT_DUP_OFDM, THE PPDU IS A non-HT DUPLICATE PPDU AND CH_BANDWIDTH PARAMETER OF THE RXVECTOR INDICATES THE ESTIMATED CHANNEL BANDWIDTH. HOWEVER IF THE PPDU IS TRANSMITTED BY A BANDWIDTH SIGNALING STA (i.e., THE TA FIELD IN THE MAC HEADER IS A BANDWIDTH SIGNALING TA), THE CH_BANDWIDTH_IN_NON_HT PARAMETER OF THE RXVECTOR INDICATES THE ACTUAL CHANNEL BANDWIDTH OF THE PPDU. |

FIG. 21

| PHY-CCA.INDICATION PRIMITIVE CHANNEL-LIST ELEMENT | IDLE CHANNELS |
|---|---|
| primary | NONE |
| secondary | PRIMARY 20 MHz CHANNEL |
| secondary40 | PRIMARY 20 MHz CHANNEL AND SECONDARY 20 MHz CHANNEL |
| secondary80 | PRIMARY 20 MHz CHANNEL, SECONDARY 20 MHz CHANNEL, AND SECONDARY 40 MHz CHANNEL |
| Per20MHz bitmap | EACH BIT OF THE BITMAP EQUAL TO 0 INDICATES AN IDLE CHANNEL |

FIG. 22

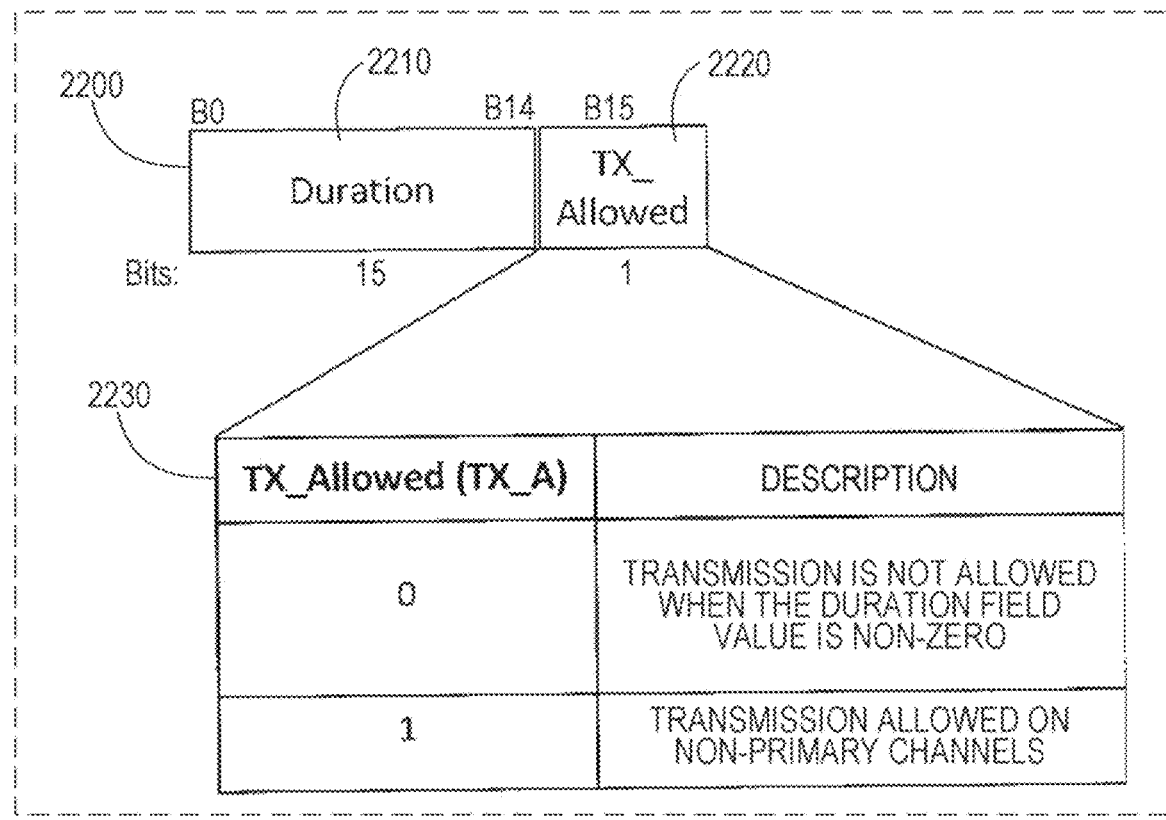

| TX_Allowed (TX_A) | DESCRIPTION |
|---|---|
| 0 | TRANSMISSION IS NOT ALLOWED WHEN THE DURATION FIELD VALUE IS NON-ZERO |
| 1 | TRANSMISSION ALLOWED ON NON-PRIMARY CHANNELS |

COMMUNICATION APPARATUS AND COMMUNICATION METHOD

BACKGROUND

1. Technical Field

The present disclosure is generally related to a communication apparatus and a communication method that utilizes a novel multi-channel virtual carrier sensing to enable more efficient usage of the wireless medium when more than one wireless network are physically co-located.

2. Description of the Related Art

IEEE (Institute of Electrical and Electronics Engineers) 802.11 Working group is currently in the process of standardizing the next generation WLAN (Wireless Local Area Network) technology under the 802.11ax Taskgroup. The primary goal of the Taskgroup is the improvement of spectrum efficiency to enhance the system throughput/area in high density scenarios of Access Points (AP) and/or terminal Stations ("non-AP STA" or simply STA in the rest of the document). A device based on the IEEE 802.11ax specification is generally termed as a High Efficiency (HE) device. Among the various technologies being proposed, Orthogonal Frequency-Division Multiple Access (OFDMA) and uplink multi-user transmission are two key technologies that the IEEE 802.11ax Taskgroup has adopted to achieve the throughput improvement goals. An 802.11 WLAN with an AP and at least one STA that has negotiated WLAN membership with that AP (known as association process) is called a Basic Service Set (BSS).

FIG. 1 illustrates an example of two 802.11ax BSSs 100 and 145; each BSS comprising a HE AP and several HE STAs associated with the HE AP respectively. A BSS operating on the same channel as a channel of a STA's BSS and partially or wholly within the STA's radio coverage is known as an Overlapping Basic Service Set (OBSS). In FIG. 1, assuming STA2 120 is associated with AP1 101, the BSS 145 is considered an OBSS for STA2 120.

The Medium Access Control (MAC) protocol of 802.11 devices, including 802.11ax devices use the contention based Carrier Sense Multiple Access with Collision Avoidance (CSMA/CA) protocol to share the wireless medium. Collision Avoidance is achieved through the use of random backoffs, whereas CSMA involves the use of physical and virtual Carrier Sense (CS) mechanisms. Physical CS mechanism is provided by the Physical layer (PHY) and involves actual sensing of the wireless medium (either Preamble Detection (PD) or Energy Detection (ED) or both). Virtual CS mechanism is provided by the MAC layer and makes use of the Network Allocation Vector (NAV).

The NAV maintains a prediction of future traffic on the medium based on the duration information that is announced in most IEEE 802.11 frames. This duration may be contained in the MAC header and/or may also be obtained from the Transmit Opportunity (TXOP) duration in the PHY header if present. TXOP duration represents an interval of time during which a particular STA has a right to initiate frame exchange sequences onto the wireless medium. When either the physical CS or the virtual CS indicates that the medium is busy, a device is not allowed to transmit any signal except for some specific frames such as the Acknowledgment (Ack) frame or Block Ack frame etc. In order to improve efficiency of the channel access mechanism in the presence of OBSSs, 802.11ax has approved the usage of two NAVs: one known as intra-BSS NAV, and the second known as basic NAV. Intra-BSS NAV is used to store a NAV value, if applicable, from a PHY protocol data unit (PPDU) that is identified as intra-BSS, i.e., the BSS with which the STA is associated. Basic NAV, on the other hand, is used to store another NAV value, if applicable, from inter-BSS PPDUs, i.e., OBSS PPDUs or from PPDUs that cannot be identified as intra-BSS or inter-BSS. See, for example, IEEE 802.11-15/013207, Specification Framework for TGax, May 2015; IEEE Std 802.11-2012; IEEE 802.11-16/0024r1, Proposed TGax draft specification; and IEEE 802.11-16/0054r1, UL MU CCA Response.

SUMMARY

When a STAs basic NAV is set to a non-zero value due to OBSS transmission, since the virtual CS indicates busy, the Uplink Multi-User Channel Sensing (UL MU CS) rule prohibits the STA from transmitting a HE trigger-based PPDU on the RU allocated by a Trigger frame, even when Energy Detection on the 20 MHz channels containing the allocated RUs indicates that the channels are idle. This leads to a loss of transmission opportunity for STAs, thus decreasing efficiency of the Uplink multi-user transmission in the presence of OBSS traffic.

One non-limiting and exemplary embodiment provides a communication apparatus and a communication method that can facilitate improving the efficiency of the Uplink multi-user transmission in the presence of OBSS traffic.

In one general aspect, the techniques disclosed here features: a communication apparatus comprising: a receiver which, in operation, receives a PHY layer Data Unit that includes a duration field, the duration field including duration information that indicates a duration of time during which the communication apparatus is prohibited from transmitting a high efficiency (HE) trigger-based (TB) PHY layer Data Unit; and Physical (PHY) layer circuitry which, in operation, issues a PHY-CCA (clear channel assessment) primitive parameter indicating bandwidth information on a busy or idle state for each subchannel within an operating bandwidth; and Media Access Control (MAC) circuitry which, in operation, updates a Network Allocation Vector (NAV) value based on the duration information when the indicated duration is greater than a current NAV value and when it is determined that the communication apparatus is not a targeted recipient of the received PHY layer Data Unit; and, in operation, determines busy/idle state of at least one subchannel that includes an resource unit (RU) in which the HE TB PHY layer Data Unit is to be transmitted, based on the bandwidth information; wherein the MAC circuitry, in operation, controls transmission of the HE TB PHY layer Data Unit based on the updated NAV value and the busy/idle state of the at least one subchannel, and controls the PHY circuitry to have the HE TB PHY layer Data Unit transmitted when the at least one subchannel, which does not include a primary subchannel, is considered idle, regardless of whether the primary subchannel is busy or not.

The communication apparatus and communication method described in the present disclosure can facilitate improving the efficiency of the uplink multi-user transmission in the presence of OBSS traffic.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram of an example uplink multi-user transmission that illustrates the UL MU CS rule in 802.11ax;

FIG. 6 is a table illustrating how the various parameters related to the UL MU CS mechanism are updated for the frame sequence depicted in FIG. 4;

FIG. 8B is a table illustrating how the various parameters related to the UL MU CS mechanism are updated based on the modified multi-channel virtual CS rule as per the first embodiment;

FIG. 12 is a table illustrating the additional members proposed for the PHY-CCA. indication primitive as per the first embodiment;

FIG. 20 is a table listing how a STA obtains the channel bandwidth information from a received PPDU;

FIG. 21 is a table illustrating the additional members proposed for the PHY-CCA. indication primitive as per the third embodiment;

FIG. 22 is the format of the NAV maintained by a STA and the encoding of the TX_Allowed field as per the fourth embodiment;

DETAILED DESCRIPTION

The present disclosure can be better understood with the aid of following figures and embodiments. The embodiments described here are merely exemplary in nature and are used to describe some of the possible applications and uses of the present disclosure and should not be taken as limiting the present disclosure with regard to alternative embodiments that are not explicitly described herein.

As explained earlier, multi-user transmission using OFDMA in both downlink and uplink direction is a key technology that the IEEE 802.11ax Taskgroup has adopted to achieve the throughput improvement goals. In the downlink direction, since it is the AP that will be transmitting all the multi-user frames, the multi-user transmission is comparatively simpler than in the uplink direction. The Downlink (DL) multi-user PPDU is made up of a wide channel PHY header that carries information regarding narrow band channels (known as Resource Units or RUs) on which each individual PHY Service Data Unit (PSDU) is carried. Transmission in the uplink direction is more complicated than in the downlink direction since there is a need for time synchronization of the transmissions from multiple STAs and also it has to be ensured that the transmissions from different STAs do not interfere with each other, i.e., each STA has to be assigned a unique RU. This is achieved in IEEE 802.11ax through a special control frame called a Trigger frame which is transmitted by the AP.

The Trigger frame contains information such as Resource Unit (RU) Allocation, the Uplink (UL) PPDU length, the MCS etc, to be used for the UL transmission. In addition, the Trigger frame also contains the "CS Required subfield", which informs the STAs whether or not Carrier Sense is required prior to the UL MU transmission. Upon receiving the Trigger frame, the STAs that are allocated RUs in the Trigger frame can transmit their respective UL frames in an UL multi-user (MU) PPDU after a time period of Short Interframe Space (SIFS) from the end of the Trigger frame. If the value of the "CS Required subfield" in the Trigger frame is 1, a STA is required to follow the Uplink Multi-User Channel Sensing (UL MU CS) procedure which states that to participate in an UL MU transmission, a STA is required to consider the virtual CS and also perform an Energy Detection on all the 20 MHz channels on which RU has been allocated to the STA. The STA is allowed to transmit the HE trigger-based PPDU only if the virtual CS is idle and all the 20 MHz channels containing the allocated RUs in the Trigger frame are considered idle as well. If the 20 MHz channels are not all idle, then the STA is not allowed to transmit on the allocated RUs.

Figure 1:
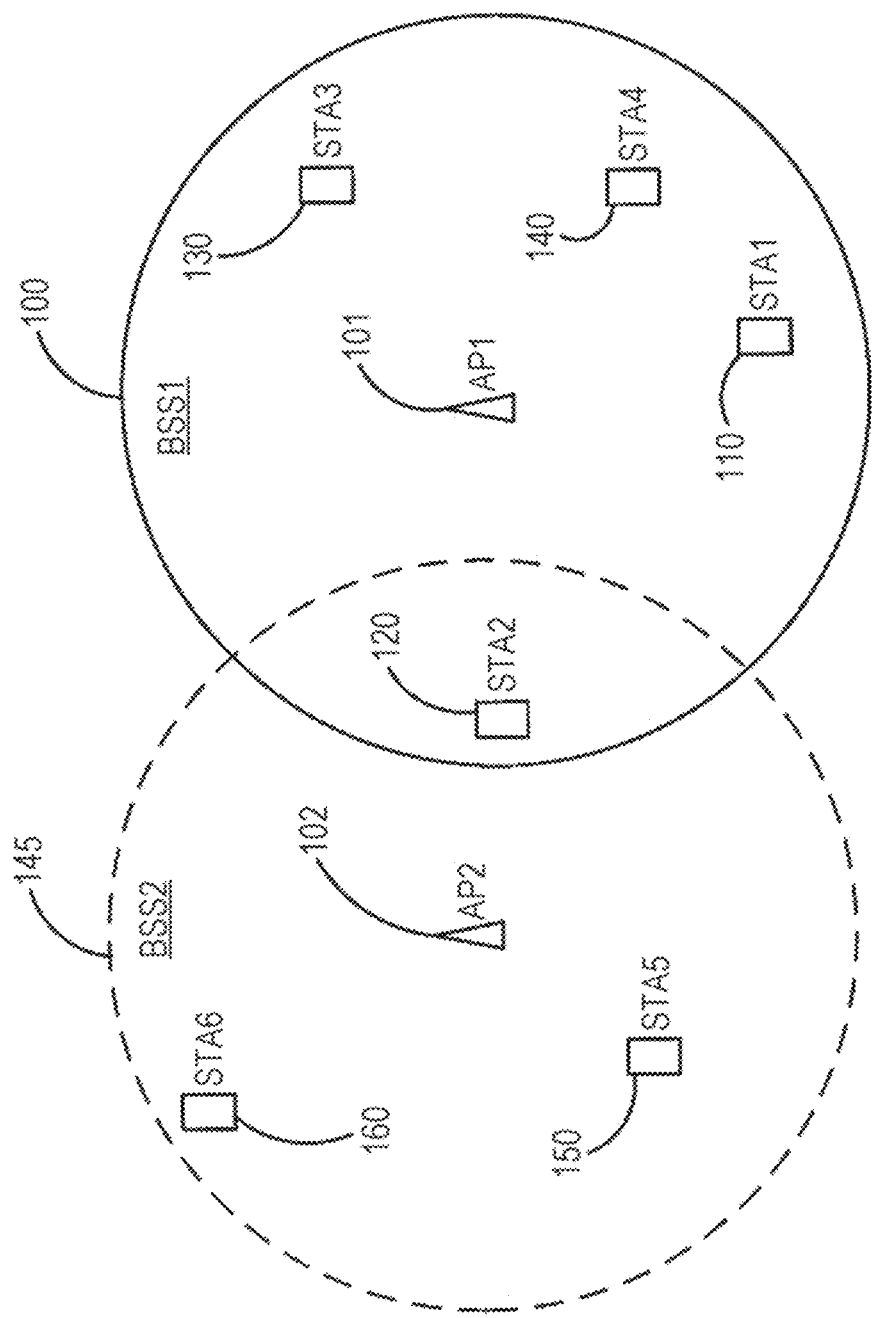
FIG. 1 is a diagram of overlapping wireless networks in which the embodiment of the present disclosure may be applied.

Referring to FIG. 1, two overlapping BSSs (OBSS) are depicted. The first BSS, BSS1 100, comprises an AP, AP1 101, and four STAs associated with AP1: STA1 110, STA2 120, STA3 130 and STA4 140. The second BSS, BSS2 145, comprises an AP, AP2 102, and two STAs associated with AP2: STA5 150 and STAG 160. The circles around AP1 101 and AP2 102 also represent the radio coverage area of AP1 and AP2, respectively. As can be seen from FIG. 1, STA2 120 is located at the edge of AP1's radio coverage and happens to be within the radio coverage of AP2 as well. As such, for STA2 120, BSS2 145 is considered an OBSS. The identity of the BSS, to which a received frame belongs to, may be determined by the recipient of the frame by checking the BSS color field in the PHY header of the HE PPDU that carries the frame, or by checking the Basic Service Set Identifier (BSSID) field in the MAC header of the frame.

Figure 2:
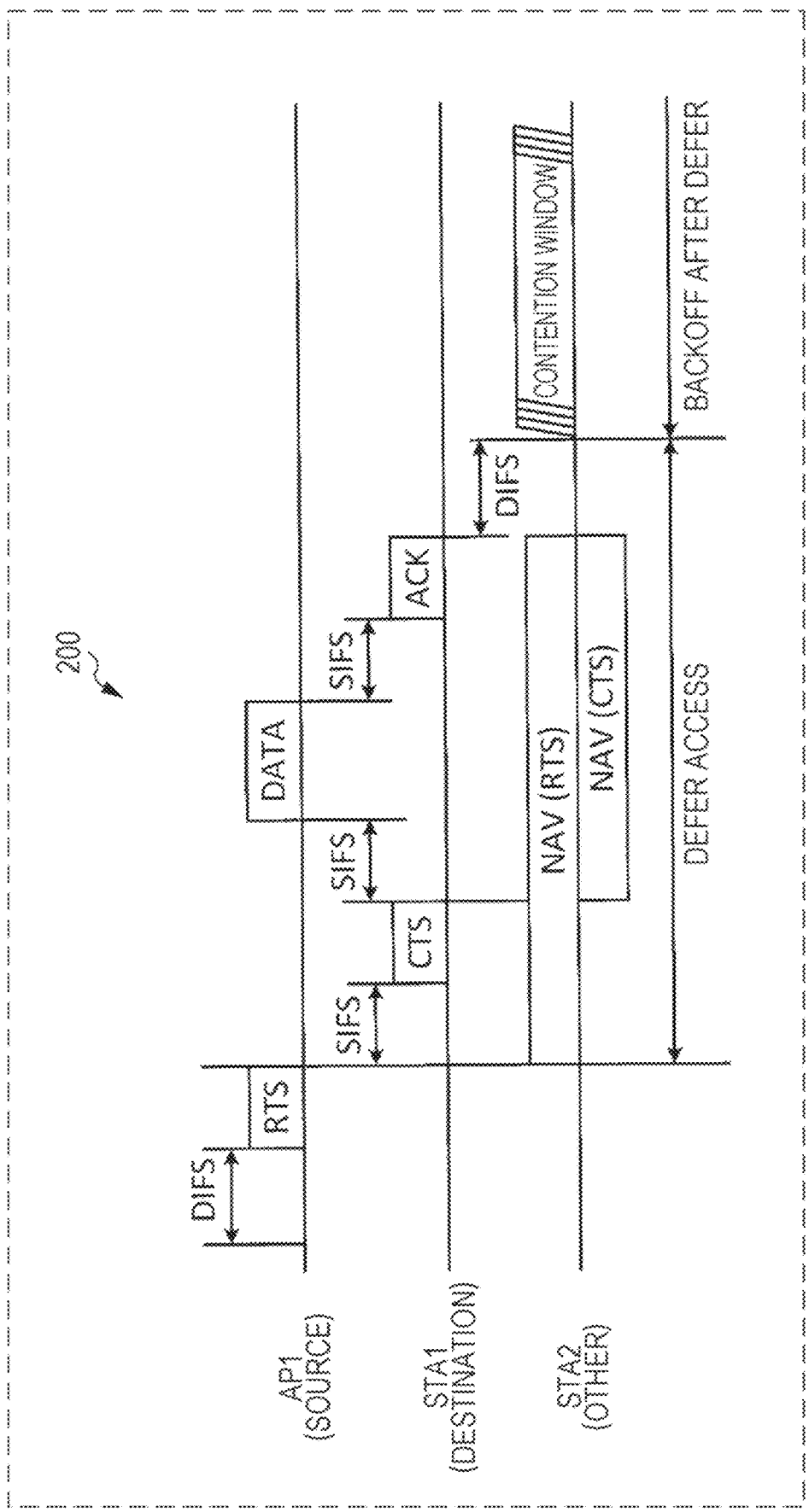
FIG. 2 is a timing diagram of an example frame exchange sequence highlighting the NAV setting procedure.

FIG. 2 illustrates an example frame exchange sequence 200 that highlights the 802.11 NAV setting procedure. AP1 101 intends to transmit a Data frame to STA1 110 and in order to protect the transmission, AP1 first transmits a Request To Send (RTS) frame to STA1, to which STA1 responds with a Clear To Send (CTS) frame that will be transmitted after a time period of a Short Interframe Space (SIFS) from the end of the RTS frame. The Duration field in the RTS frame is set to a value that indicates a time period between the end of RTS frame and the end of the Ack frame sent in response to the Data frame. All STAs that received the RTS frame, except the intended recipient STA1, update their NAV to the value of the Duration field in the RTS frame if their existing NAV value is smaller. Similarly, all STAs that received the CTS frame, except the intended recipient AP1, update their NAV to the value of the Duration field in the CTS frame if their existing NAV value is smaller. In this way, all the STAs that are within the radio coverage of AP1 and STA1 will have their NAV set. Upon successfully receiving the CTS frame, AP1 transmits the Data frame after a time period of SIFS from the end of the CTS frame to which STA1 responds with an Ack frame. Since STA2 120 and all the other STAs that received the RTS/CTS frames have their NAVs set, they are not allowed to transmit during this duration thereby ensuring that the Data frame transmission by AP1 is protected.

Figure 3A:
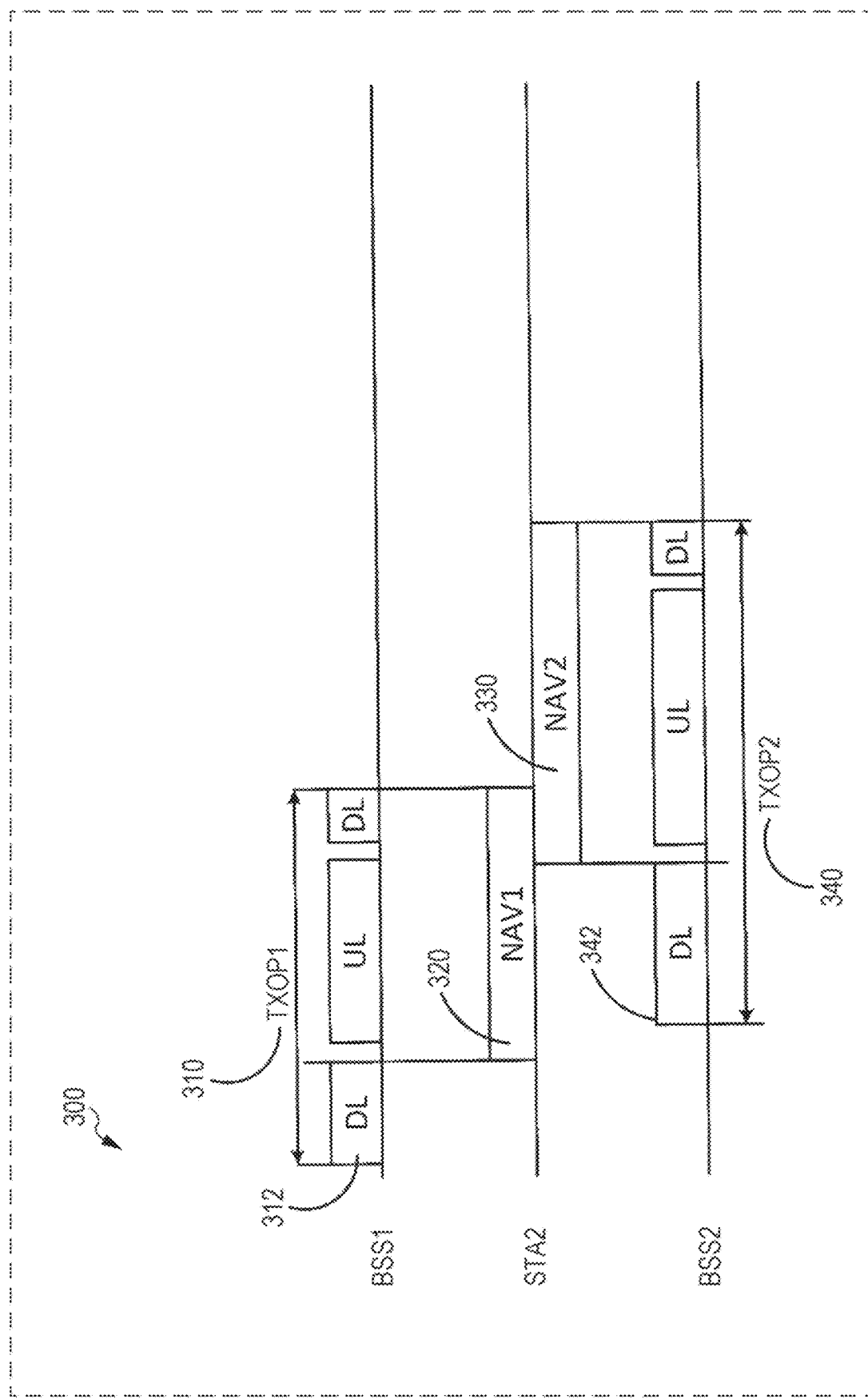
FIG. 3A is a timing diagram of another example frame exchange sequence clarifying how the two NAVs introduced in 802.11ax are updated.

FIG. 3A illustrates example frame exchange sequences 300, within the two BSSs 100 and 145 in FIG. 1, and highlights the procedure for updating the two NAVs introduced in 802.11ax: the intra-BSS NAV and the basic NAV. Maintaining two NAVs would enable more efficient spatial reuse of the frequency resources under certain conditions. The example depicts two ongoing transmission sequences: first, TXOP1 310 in BSS1 100, between AP1 101 and STA1 110; and second TXOP2 340 in BSS2 145, between AP2 102 and STA5 150. Upon receiving the DL PPDU 312, by checking either the BSS Color field or the BSSID field or both, STA2 120 determines that the PPDU 312 is an intra-BSS PPDU and since STA2 is not a recipient of the PPDU 312, STA2 sets its intra-BSS NAV, NAV1 320, to a value that indicates time period between the end of DL PPDU 312 and the end of TXOP1. Similarly upon receiving the DL PPDU 342, by checking either the BSS Color field or the BSSID field or both, STA2 determines that the PPDU 342 is an inter-BSS PPDU and STA2 sets its inter-BSS NAV, NAV2 330, to a value that indicates time period between the end of DL PPDU 342 and the end of TXOP2.

Figure 3B:
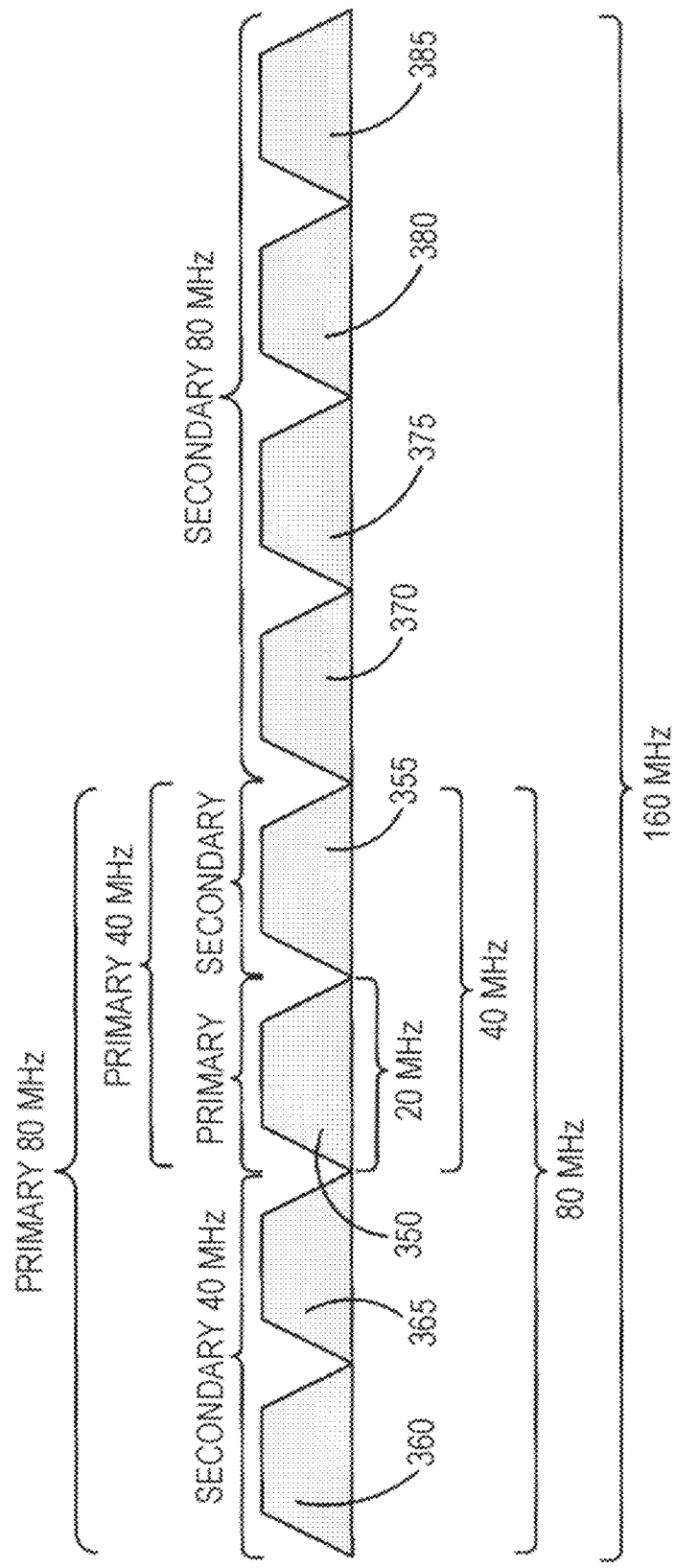
FIG. 3B is a diagram illustrating the naming convention of the 20 MHz channels in a wide band channel.

Referring to FIG. 3B, the naming convention for the 20 MHz channels in an 802.11 infrastructure BSS operating on 40 MHz, 80 MHz or 80+80 MHz or 160 MHz channel is illustrated. This is just an example of how a wide bandwidth channel may be formed and many other similar configurations are possible. When a BSS is initially set up, one of the 20 MHz channels 350 is designated as the primary 20 MHz channel. The primary 20 MHz channel is also simply called the primary channel, and holds a very important significance. The IEEE 802.11 specification requires all transmissions in an infrastructure BSS to include the primary 20 MHz channel, except in the case of uplink OFDMA based multi-user transmission where an STA may be allowed to transmit their uplink PPDU on a channel that does not include the primary 20 MHz channel.

In addition, in an infrastructure BSS, all beacon frames are transmitted on the primary 20 MHz channel. Any 20 MHz channel other than the primary 20 MHz channel is referred to as nonprimary channel. The 20 MHz channel 355 adjacent to the primary 20 MHz channel that together forms, the 40 MHz channel of a 40 MHz BSS, or the Primary 40 MHz of a wider BSS, is called the secondary 20 MHz or simply the secondary channel. In an 80 MHz or wider BSS, the primary 20 MHz channel 350 and the secondary 20 MHz channel 355 together forms the primary 40 MHz channel. In an 80 MHz or wider BSS, the 40 MHz channel (comprised of the two 20 MHz channels 360 and 365) adjacent to the primary 40 MHz channel that together form the 80 MHz channel of a 80 MHz BSS or the primary 80 MHz channel of a wider BSS, is called the secondary 40 MHz channel. In an 80+80 MHz or a 160 MHz BSS, the primary 40 MHz channel and the secondary 40 MHz channel together form the primary 80 MHz channel. In an 80+80 MHz or a 160 MHz BSS, the 80 MHz channel not including the primary 20 MHz channel 350 (comprised of the four 20 MHz channels 370, 375, 380 and 385), that together with the primary 80 MHz channel form the 80+80 MHz or the 160 MHz channel is called the secondary 80 MHz channel. In a 160 MHz channel, the primary 80 MHz and the secondary 80 MHz channels are adjacent to each other whereas in an 80+80 MHz channel, the primary 80 MHz and the secondary 80 MHz channels need not be adjacent to each other and may be located in different parts of the operating frequency band.

Referring to FIG. 4, an example UL MU transmission sequence 400 is illustrated to clarify the UL MU CS procedure in 802.11ax. The Uplink Multi-User (UL MU) transmission is initiated by the AP by transmitting a special control frame called a Trigger frame 410. The Trigger frame 410 contains information such as Resource Unit (RU) Allocation, the PPDU length, the MCS etc. to be used by STAs for the UL transmission. Upon receiving the Trigger frame 410, the STAs that are allocated RUs in the Trigger frame can transmit their respective UL frames in an UL multi-user PPDU after a time period of SIFS from the end of the Trigger frame without the need to contend for the wireless medium.

The UL MU CS procedure in 802.11ax states that in order to participate in an UL MU transmission, a STA that is allocated RU in a Trigger frame with the CS Required field set to 1, is required to consider the virtual CS and also perform an Clear Channel Assessment based on Energy Detection (ED-based CCA) on all the 20 MHz channels on which RU has been allocated to the STA. The STA is allowed to transmit its UL PPDU (HE trigger-based PPDU) only if the virtual CS is idle and all the 20 MHz channels containing the allocated RU are considered idle by ED-based CCA as well. If the 20 MHz channels at not all idle, then the STA is not allowed to transmit on the allocated RU. The virtual CS is considered idle if the counter value of both the intra-BSS NAV and the basic NAV are zero. In this example, the BSS1 100 in FIG. 1 is operating on an 80 MHz channel and let CH1, CH2, CH3 and CH4 denote the primary, secondary, tertiary and quaternary 20 MHz channels. In 802.11 terms, CH1 is called the primary 20 MHz or simply the primary channel, CH2 is called the secondary 20 MHz or simply the secondary channel, while CH3 and CH4 together form the secondary 40 MHz channel.

At the moment when the STAs receive the Trigger frame 410 from the AP1 101, there are no ongoing transmissions within the radio coverage area of STA1, STA2, STA3 and STA4 on the primary 20 MHz channel CH1 and both the intra-BSS NAV and the basic NAV of all four STAs are set to zero. However there is an ongoing transmission on CH3 within STA2's radio coverage area as illustrated by 460. AP1 101 initiates the UL MU transmission sequence by transmitting a Trigger frame 410 that allocates: one 106-tone RU each on CH1 to STA1 110 and STA4 140; one 242-tone RU on CH2 to STA3 130 and a 484-tone RU covering CH3 and CH4 to STA2 120. Since both the ED-based CCA as well as the virtual CS returns idle, STA1, STA3 and STA4 transmit their respective UL PPDUs 420, 440 and 430. However, in the case of STA2, although the virtual CS returns idle, the ED-based CCA will return busy on CH3. Since the 20 MHz channels containing the RU allocated to STA2 are not all idle, according to the UL MU CS rule, STA2 is prohibited from transmitting its UL PPDU 450.

Figure 5:
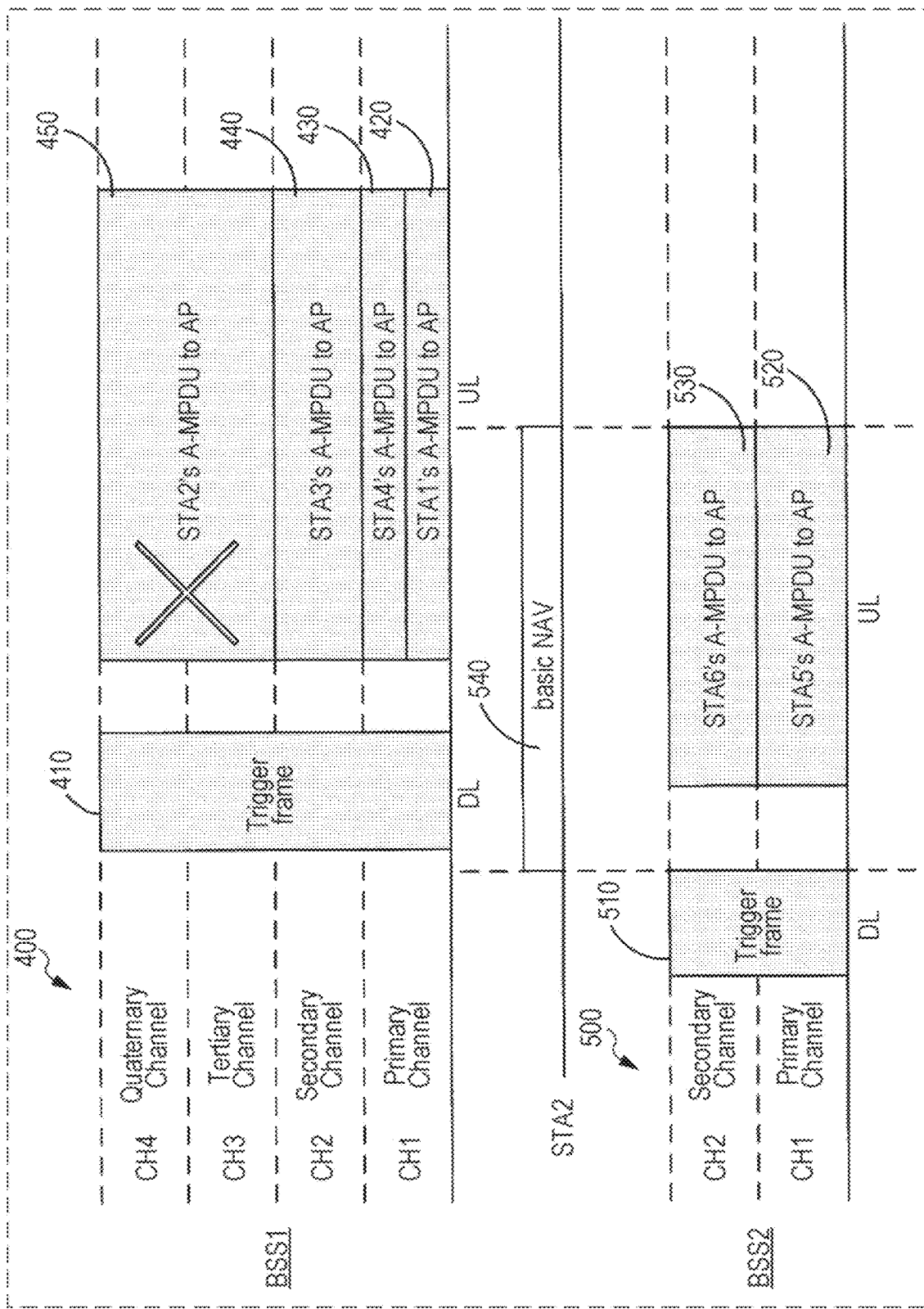
FIG. 5 is a diagram illustrating the technical problem addressed in the present disclosure.

FIG. 5 illustrates an example UL MU transmission sequence 400 in a slightly different channel condition. At the moment when the STAs receive the Trigger frame 410 from the AP1 101, there are no ongoing transmissions within the radio coverage area of STA1, STA3 and STA4 on the primary 20 MHz channel and both the intra-BSS NAV and the basic NAV of the STAs are set to zero. However there is an ongoing OBSS transmission in BSS2 145, within STA2's radio coverage area, on the primary and secondary channels CH1 and CH2 as illustrated by the transmission sequence 500. AP2 102 initiates an UL MU transmission in BSS2 by transmitting a trigger frame 510 for allocating RUs to STA5 150 and STA6 160. SIFS after the end of the trigger frame 510, STA5 and STA6 transmit their respective UL PPDU on the respective allocated RUs. Upon receiving the DL PPDU carrying the trigger frame 510, STA2 determines that it is an OBSS PPDU and sets its basic NAV to a non-zero value.

The table 600 in FIG. 6 lists the various parameters related to the UL MU CS mechanism for STA2 during the UL MU transmission sequence shown in FIG. 5. Since the transmission on the primary channel CH1 belongs to OBSS, STA2's basic NAV is set to a non-zero value and even though the intra-BSS NAV is zero, the Virtual CS indicates busy. Similarly the ED-based CCA returns busy on CH1 and CH2 and idle on CH3 and CH4. As per the UL MU CS rule, even though there are no ongoing transmissions on both the channels containing the RU for STA2, CH3 and CH4, since the virtual CS indicates busy, UL MU CS considers the medium as busy on all of four 20 MHz channels and consequently STA2's UL PPDU 450 is not allowed to be transmitted. This may be seen as a case where the basic NAV is over-protective. That is to say, even if STA2 was allowed to transmit its UL PPDU 450 on CH3 and CH4, the transmission would not have caused any interference to the OBSS transmission and would have led to higher channel usage efficiency.

The above illustrated shortcoming is caused by the fact that NAV (baseline NAV or intra-BSS NAV or basic NAV) is solely based on the activities on the Primary 20 MHz channel and does not consider/provide information on the state of the nonprimary channels. As long as the Primary 20 MHz is busy due to reception of a valid PPDU, the NAV is set and the states of the rest of the secondary channels are not recorded. Since 802.11ax has introduced OFDMA based narrow band transmissions, if this over-protection can be avoided, further gains can be made in the channel reuse efficiency.

Based on the above knowledge, the inventors of this application have reached the present disclosure, Communication methods and communication apparatuses are disclosed that improve the efficiency of the Uplink multi-user transmission in the presence of OBSS traffic. As per the disclosed methods, a frequency dimension is added to the NAV and a NAV not only records the duration for which the primary channel, that forms a part of a wide band channel, is busy, but also records which other nonprimary channels, of the wide band channel, are busy. By referring to this information of busy channels, a STA can easily infer which channels are idle and may be used for concurrent transmissions without causing interference on the busy channels.

The various embodiments for the efficient multi-channel virtual carrier sensing proposed in the present disclosure are described in detail in the following sections.

<FIRST EMBODIMENT>

As noted earlier, currently, NAV (baseline NAV or intra-BSS NAV or basic NAV) is solely based on the activities on the Primary 20 MHz channel and does not consider/provide information on the state of the nonprimary channels. As long as the Primary 20 MHz channel is busy due to reception of a valid PPDU, the NAV is set and the states of the rest of the nonprimary channels are not recorded. In order to overcome this limitation of the current NAV mechanism, the first embodiment adds a frequency dimension to the NAV such that a NAV not only records the duration for which a primary channel is busy, but also records the nonprimary channels that are busy. For this purpose, a field called BW (bandwidth) is added to the NAV to record the bandwidth information of the PPDU or the frame that set the NAV. Since the bandwidth of a PPDU that sets NAV always includes the primary 20 MHz channel, the BW field indicates which of the nonprimary channels are busy. With this information of the busy channels a STA can easily infer which channels are idle and may be used for concurrent transmissions without causing interference on the busy channels.

Figure 7A:
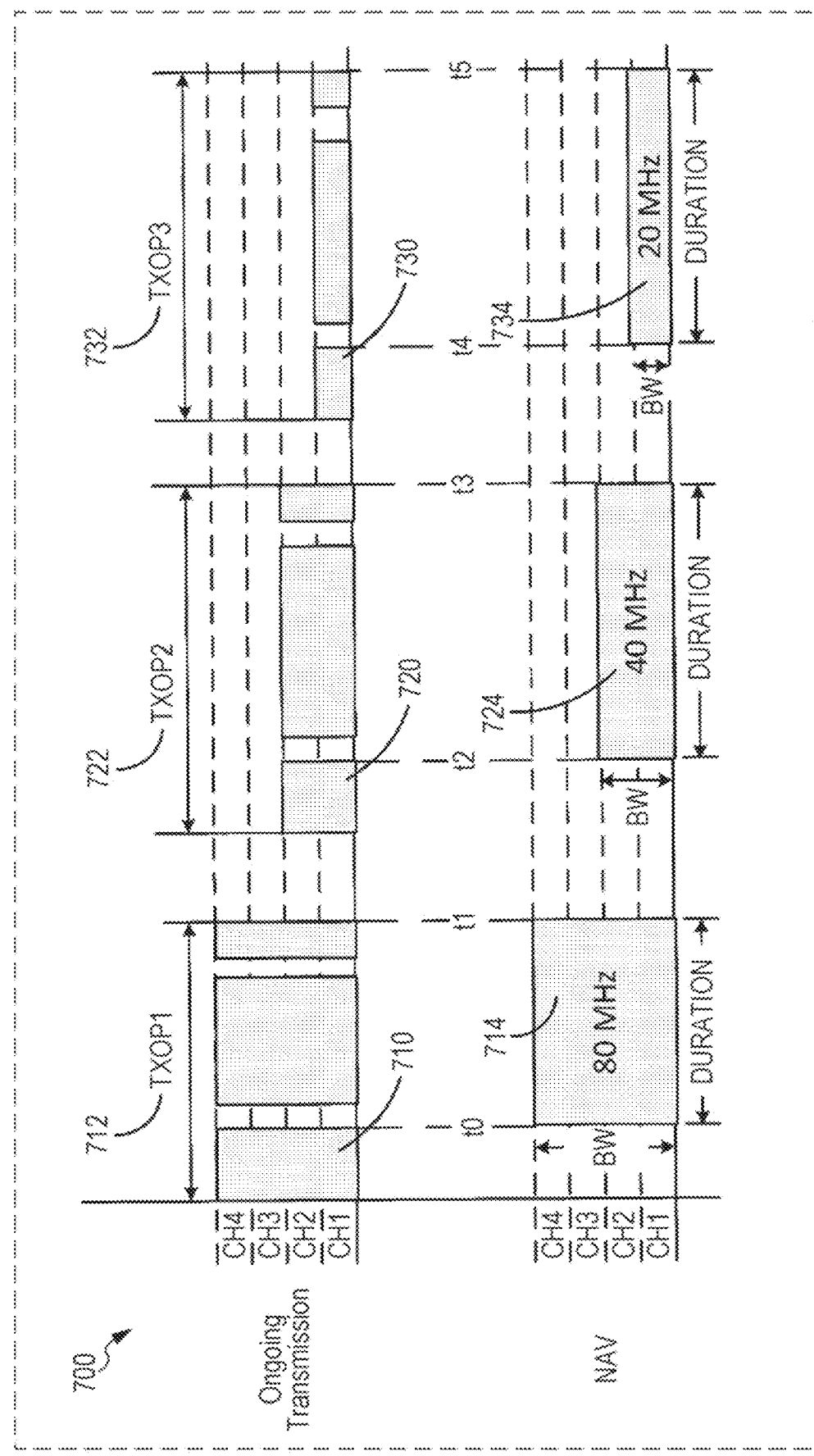
FIG. 7A is an example of frame exchange sequences illustrating the multi-channel virtual carrier sensing (CS) introduced in the first embodiment.

Referring to FIG. 7A, a series of example frame exchange sequences are shown to provide a visual illustration of the concept of the frequency dimension of the NAV in an 80 MHz BSS. The upper half of FIG. 7A depicts three transmission sequences of different bandwidths: an 80 MHz TXOP1 712, a 40 MHz TXOP2 722 and a 20 MHz TXOP3 732. Each transmission sequence comprises an exchange of PPDUs between an AP and one or more STAs that belong to the same BSS as the AP. As an example, the first PPDU in the transmission sequence can be a Trigger frame allocating RUs to selected STAs for UL MU transmission, followed by HE trigger-based PPDUs from the STAs and ending with DL PPDU from the AP carrying acknowledgment frames. In this example, CH1, CH2, CH3 and CH4 denote the primary, secondary, tertiary and quaternary 20 MHz channels, respectively. The lower half of FIG. 7A provides a visual representation of the two dimensional NAV maintained by a third party STA as proposed by the present disclosure. Time points relevant to this example are denoted by t0, t1, t2, t3, t4 and t5.

Any STA that is within the radio coverage of an ongoing transmission and is neither a transmitter nor a recipient of the transmission is considered a third party STA for that transmission. Upon receiving the first PPDU 710 of TXOP1 712, a third party STA determines that the third party STA itself is not a recipient of the PPDU 710, for example, by reading the receiver address in the MAC header of the frames carried by the PPDU, or by reading the AID12 subfield of the User Info field of the Trigger frame carried in the PPDU 710 etc.

Once the STA has determined that the STA itself is not a recipient of the PPDU 710, as per the existing NAV rule, it sets the NAV duration to a time duration from time t0 to time t1, prohibiting the STA from transmitting till the time t1 which is the end of TXOP1 712. In addition to recording the NAV duration, as per the first embodiment, the STA also records the BW field of the NAV as 80 MHz which is the bandwidth of the received PPDU 710. The two dimensional NAV is represented by the box 714 representing the time duration and frequency range within which the STA is prohibited from transmitting. At time t1, when the NAV duration counts down to zero, the BW field is also reset to zero.

Similarly, upon receiving PPDU 720, the STA sets the NAV duration to a time duration from time t2 to time t3 which is the end of TXOP2 722, while the BW field is set to 40 MHz, the bandwidth of the PPDU 720. This is illustrated as the box 724. If the channel sensing rules are also modified accordingly, under certain conditions, the third party STA may be allowed to transmit on the unoccupied channels CH3 and CH4 within the NAV duration from t2 till t3 without causing interference to the ongoing transmission 722, thereby promoting more efficient re-use of the unoccupied secondary channels.

At time t3, when the NAV duration counts down to zero, the BW field is also reset to zero. In the same way, upon receiving the PPDU 730, the STA sets the NAV duration to a time duration from time t4 to time t5 which is the end of TXOP3 732, while the BW field is set to 20 MHz, the bandwidth of the PPDU 730. This is illustrated as the box 734. In this case, the third party STA may be allowed to transmit on the unoccupied channels CH2, CH3 and CH4 within the NAV duration from t4 till t5 without causing interference to the ongoing transmission 732. At time t5, when the NAV duration counts down to zero, the BW field is also reset to zero.

Figure 7B:
FIG. 7B is a table illustrating the encoding scheme for the BW field of the NAV as per the first embodiment.

FIG. 7B shows a table 750 of an example encoding for the BW field. Using two bits, the BW field can represent the four different bandwidths that are supported by 802.11ax. A value of 0 indicates a busy primary 20 MHz, a value of 1 indicates a busy primary 40 MHz, a value of 2 indicates a busy primary 80 MHz while a value of 3 indicates that the whole 160 MHz or the 80+80 MHz channel is busy. As per the BW encoding listed in 750, in the example shown in FIG. 7A, the BW field would be set to 2 for the NAV setting 714, 1 for the NAV setting 724 and 0 for the NAV setting 734.

The concept of adding a frequency dimension to the NAV can be easily extended to the two NAVs explained in FIG. 3A. Either one of the NAVs or both NAVs can be extended to record the bandwidth of the ongoing transmissions in their respective BSS. Referring back to FIG. 5, the over-protective NAV that prohibited STA2 from transmitting the UL PPDU 450, may be overcome by applying the concept of recording the bandwidth of the ongoing OBSS transmission as the BW field of the basic NAV and at the same time making some changes to the Virtual CS rule and the UL MU CS mechanism.

As explained earlier, in the example shown in FIG. 5, STA2's basic NAV is set to a non-zero value at the moment it receives the Trigger frame 410 from the AP1 101, which leads to the Virtual CS being busy for STA2. As per the current UL MU CS rule, even though there are no ongoing transmissions on CH3 and CH4, since the virtual CS indicates busy, UL MU CS mechanism considers the medium as busy on all four channels and consequently STA2's UL PPDU 450 is not allowed to be transmitted even though both the channels containing the RU for STA2 are not busy. The current Virtual CS rule indicates busy for the whole wideband channel as long as either one of the NAVs is busy regardless of the actual conditions of the nonprimary channels.

Figure 8A:
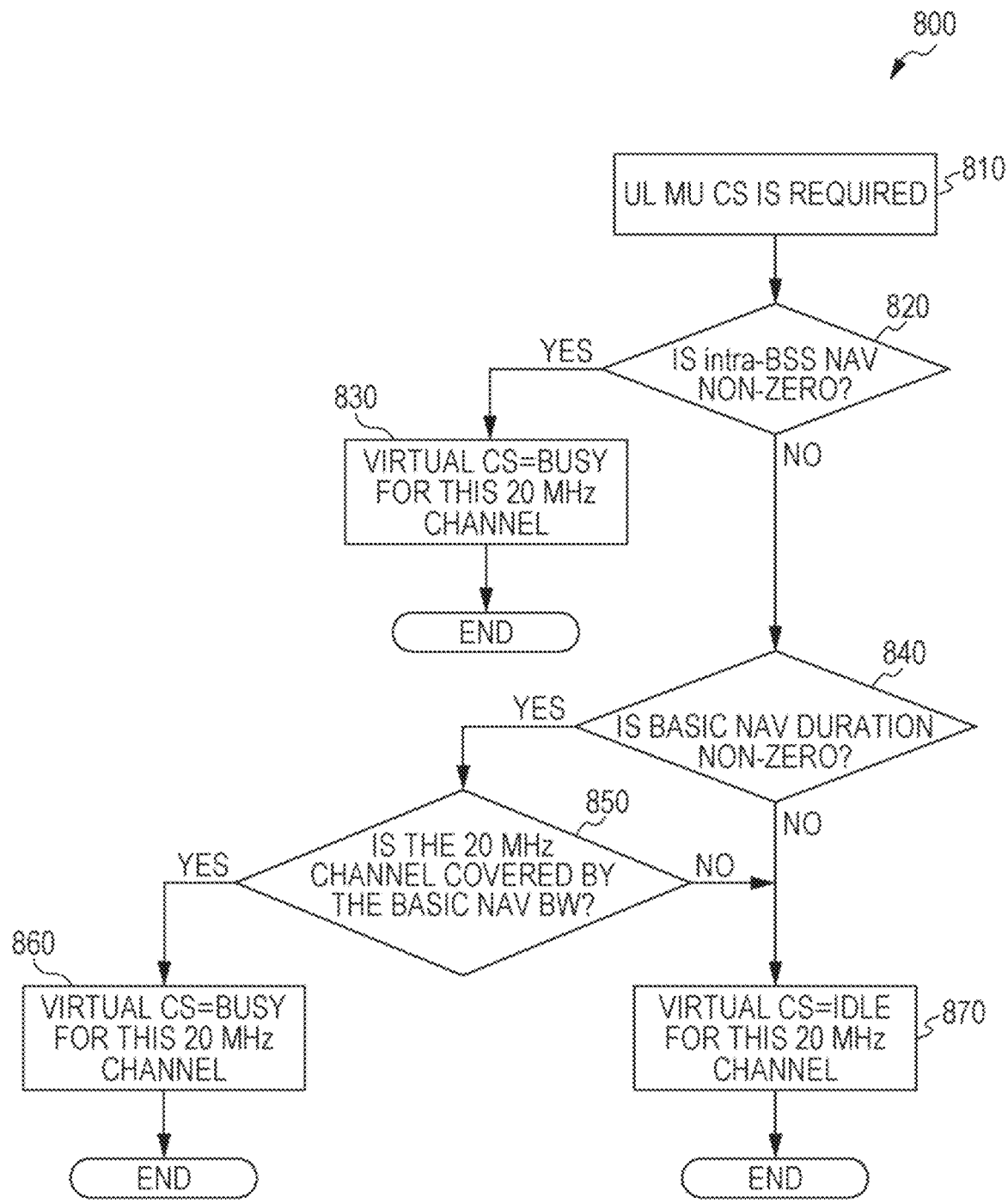
FIG. 8A is a flowchart illustrating the rule for the multi-channel virtual CS as per the first embodiment.

FIG. 8A depicts a flow chart 800 that explains how the Virtual CS rule may be indicated per 20 MHz channel by adding a bandwidth field to the basic NAV. Starting from the primary 20 MHz channel, for each of the 20 MHz channel of the wide-band channel on which a Trigger frame is received, the process starts at step 810 when a STA receives the Trigger frame with the CS Required field set to 1 and allocates RU to the STA. Since the CS Required field is set to 1 in the Trigger frame, the STA is required to perform UL MU CS before transmitting a HE trigger-based PPDU on the allocated RU. At step 820, if the intra-BSS NAV is non-zero, the process moves to step 830 where the Virtual CS indicates busy for the 20 MHz channel and the process ends and moves to the next 20 MHz channel if any. However, if the intra-BSS NAV is zero at step 820, the process moves to step 840.

At step 840, if the basic NAV Duration is zero, the process proceeds to step 870 where the Virtual CS indicates idle for the 20 MHz channel and the process ends and moves to the next 20 MHz channel if any. However, if the basic NAV is non-zero at step 840, the process moves to step 850. At step 850, if the 20 MHz channel is indicated as one of the busy channels by the BW field of the basic NAV, the process moves to step 860 where the Virtual CS indicates busy for the 20 MHz channel and the process ends and moves to the next 20 MHz channel if any. However, at step 850, if the 20 MHz channel not indicated as one of the busy channels by the BW field of the basic NAV, the process moves to step 870 where the Virtual CS indicates idle for the 20 MHz channel and the process ends and moves to the next 20 MHz channel if any. Since the modified Virtual CS rule allows the Virtual CS to be reported for each of the individual 20 MHz channel, the UL MU CS mechanism is also modified such that the busy/idle state is reported for each of the individual 20 MHz channel. If either the energy-detect (ED) or the Virtual CS returns busy on a particular 20 MHz channel, then the 20 MHz channel is considered busy.

If both the energy-detect (ED) and the Virtual CS returns idle on a particular 20 MHz channel, then the 20 MHz channel is considered idle. However the UL MU transmission rule remain unchanged, i.e., a STA is allowed to transmit a HE trigger-based PPDU, on an RU allocated by a Trigger frame with the CS Required field set to 1, only when all the 20 MHz channels containing the allocated RU are idle. If the 20 MHz channels containing the allocated RU are not all idle, the STA is not allowed to transmit anything on the allocated RU.

The table 880 in FIG. 8B lists the various parameters related to the modified UL MU CS mechanism for STA2 during the UL MU transmission sequence shown in FIG. 5. Compared to the table 600 of FIG. 6, table 880 includes one additional column 882 that indicates the state of the channels based on the BW field of the basic NAV. Since the transmission on the primary channel belongs to OBSS, STA2's intra-BSS NAV is zero while the Duration field of the basic NAV is set to the indicated duration of the OBSS transmission. Since the OBSS transmission occurs only on CH1 and CH2, as shown in by box 500 in FIG. 5, the BW field of the basic NAV is set to 1 (40 MHz). This translates to CH1 and CH2 being recorded as busy.

Similarly, CH3 and CH4 are recorded as idle as indicated by the entries 884 and 886 respectively. As per the modified Virtual CS rule explained in FIG. 8A, the Virtual CS returns busy on CH1 and CH2 and idle on CH3 and CH4. Similarly the ED-based CCA returns busy on CH1 and CH2 and idle on CH3 and CH4. As per the modified UL MU CS rule, since both the Virtual CS and ED-based CCA indicate busy on CH1 and CH2 and idle on CH3 and CH4, the UL MU CS mechanism considers CH1 and CH2 as busy while CH3 and CH4 are considered as idle as indicated by the entries 888, 890, 892 and 894 respectively. Since CH3 and CH4 are considered idle, as per the UL MU CS transmission rule, STA2 is allowed to transmit its UL PPDU 450 on the allocated RU on CH3 and CH4.

Figure 9:
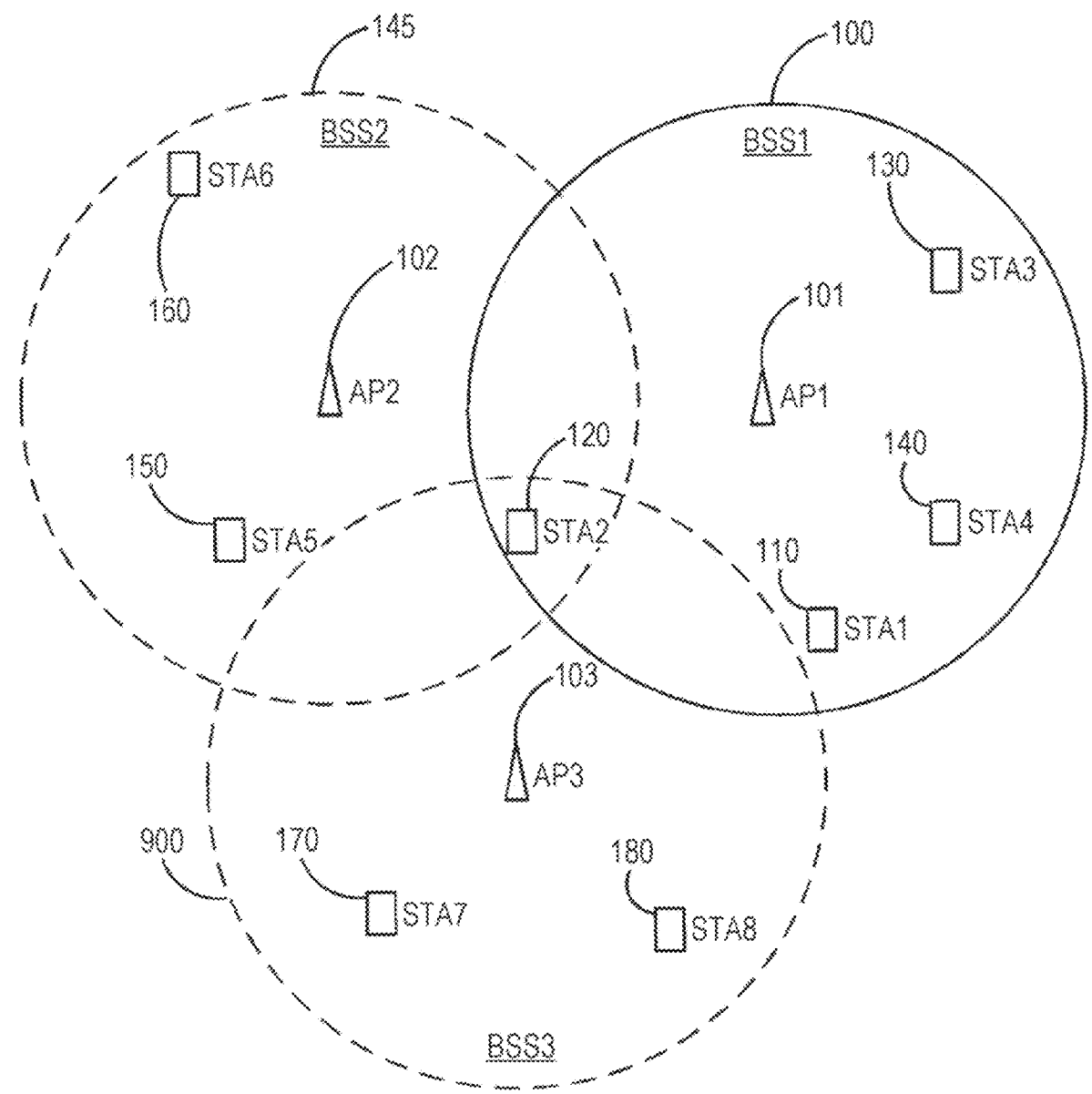
FIG. 9 is a diagram depicting three overlapping wireless networks.

FIG. 9 builds on the overlapping wireless networks depicted in FIG. 1. Aside from BSS1 100 and BSS2 145, an additional BSS, BSS3 900 is shown. BSS3 900 comprises AP3 901 and two STAs: STAT 910 and STAB 920. Since STA2 120 is also within the radio coverage of AP3 901, BSS3 900 is also considered an OBSS for STA2. The BSS layout in FIG. 9 is used to explain the rules for the update of the NAV bandwidth field introduced in the present disclosure. Two options can be considered for the update of the NAV bandwidth field BW:

Option 1 (Static update): the BW field is always set to the largest bandwidth of a NAV setting PPDU of an ongoing third party transmission. Third party transmission refers to any transmission within the reception range of a STA in which the STA is neither a transmitter nor a recipient of that transmission. A NAV setting PPDU refers to a PPDU that carries at least one frame that may lead to a change in the STA's NAV counter (either duration or BW or both). Upon the reception of a new NAV setting PPDU, if the bandwidth of the new PPDU is wider than the existing BW field, the BW field is updated to the wider bandwidth. However, if the bandwidth of the new PPDU is narrower than the existing BW field, no change is made to the BW field. The BW field is updated independent of the NAV duration, i.e. the BW field is updated if the bandwidth of the new PPDU is wider than the existing BW field even if the new PPDU does not cause the NAV duration to be updated.

Option 2 (Dynamic update): The BW field is dynamically adjusted to reflect the actual bandwidth of a NAV setting PPDU of an ongoing third party transmission. This option is more complicated as compared to option 1 and requires the temporary recording of the bandwidth and duration of each received third party transmission. While the NAV duration is always set to the longest duration of all the ongoing third party transmission, the bandwidth field is reviewed at the end of the pertinent third party transmission and updated to the actual bandwidth of the next section of the ongoing transmission.

Figure 10A:
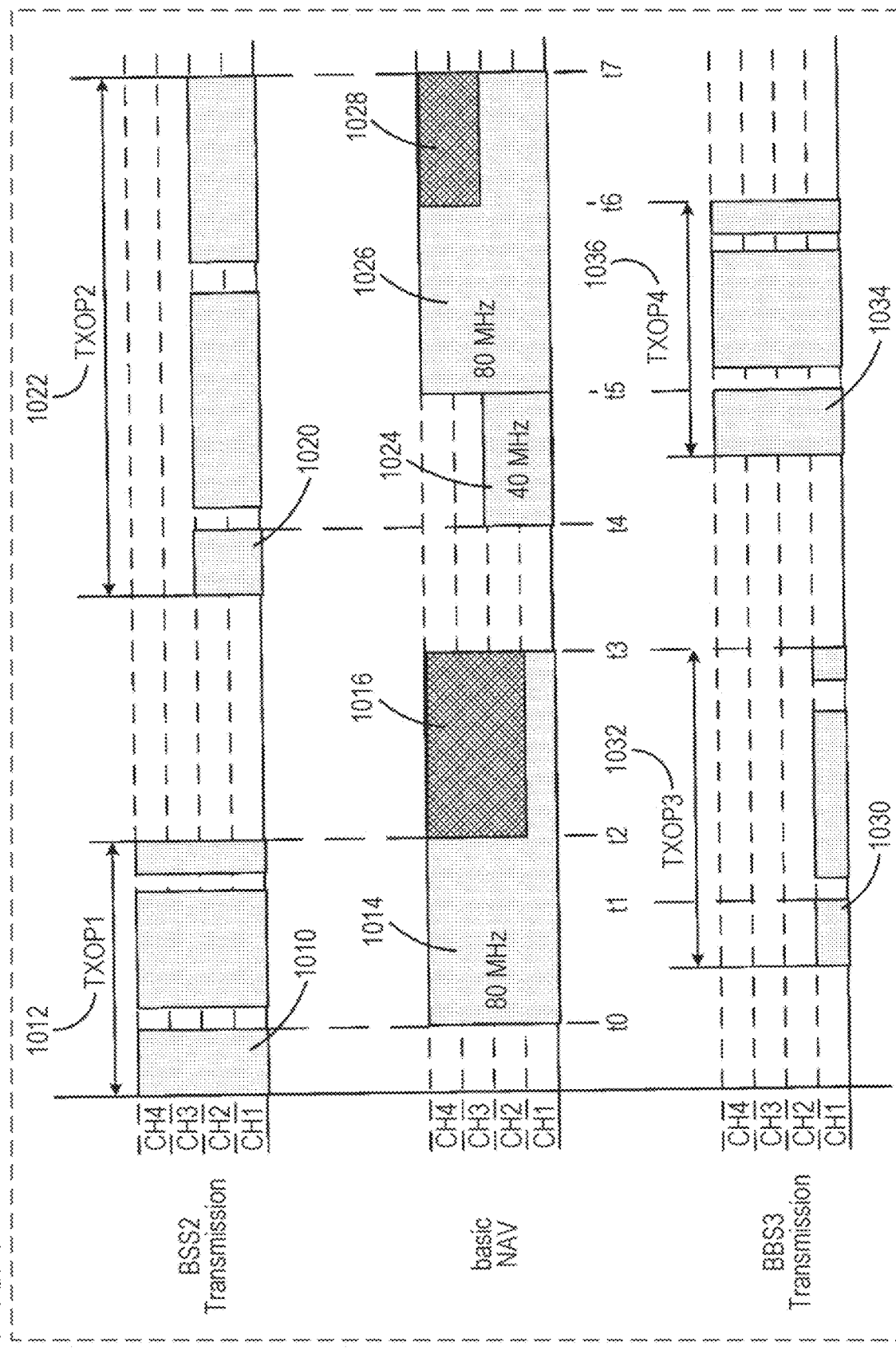
FIG. 10A is an example of frame exchange sequences illustrating the basic NAV update rule in the presence of multiple OBSSs as per the first embodiment.

Referring to FIG. 10A, a series of example frame exchange sequences are shown to provide a visual illustration of the above mentioned option 1 (static update) rules for the bandwidth field of STA2's basic NAV in the BSS layout shown in FIG. 9, assuming that all three BSSs, BSS1 100, BSS2 145 and BSS3 900 are 80 MHz BSSs. Two transmission sequences of different bandwidths in BSS2 145 are depicted at the top of FIG. 10A: an 80 MHz TXOP1 1012 and a 40 MHz TXOP2 1022. Similarly, two transmission sequences of different bandwidths in BSS3 900 are depicted at the bottom of FIG. 10A: a 20 MHz TXOP3 1032 and an 80 MHz TXOP4 1034.

The middle part of FIG. 10A depicts the visual representation of the two dimensional basic NAV maintained by STA2 120 as proposed by the present disclosure. The points in time relevant to this example are denoted by t0, t1, t2, t3, t4, t5, t6 and t7. Upon receiving the first PPDU 1010 of the TXOP1 1012, based on the BSS Color field in the PHY header or the BSSID field in the MAC header, STA2 determines that PPDU 1010 is an OBSS PPDU from BSS2 and STA2 is not one of the recipient of the PPDU 1010. As per the existing NAV rule for updating the NAV duration, STA2 sets the NAV duration from time t0 to time t2, and the NAV BW field as 80 MHz, the bandwidth of the received PPDU 1010, prohibiting STA2 from transmitting on CH1, CH2, CH3 and CH4 till the time t2 which is the end of TXOP1 1012. The two dimensional NAV is represented by the box 1014 representing, at time t0, the time duration and frequency range within which STA2 is prohibited from transmitting.

Upon receiving the first PPDU 1030 of TXOP3 1032, STA2 determines that 1030 is an OBSS PPDU from BSS3 and it is not one of the recipient of the PPDU 1030. Since the duration indicated in 1030 is longer than the existing NAV duration, as per the NAV rule for updating the NAV duration, STA2 updates the NAV duration until time t3, prohibiting STA2 from transmitting till the time t3 which is the end of TXOP3 1032. From time t2 to time t3, the actual ongoing OBSS transmission is only on BSS3 but the NAV BW field indicates 80 MHz. This can be seen as an over-protection zone 1016 whereby STA2 is restricted from transmitting on any of channels CH2, CH3 and CH4 which fall within zone 1016 even though all three channels are idle for STA2 from time t2 to time t3. At time t3, when the basic NAV duration counts down to zero, the NAV BW field is also reset to zero.

Similarly, upon receiving the first PPDU 1020 of the TXOP2 1022, STA2 determines that 1020 is an OBSS PPDU from BSS2 and it is not one of the recipient of the PPDU 1020. As per the existing NAV rule for updating the NAV duration, STA2 sets the NAV duration from time t4 to time t7, and the NAV BW field as 40 MHz, the bandwidth of the received PPDU 1020, prohibiting STA2 from transmitting on CH1 and CH2 till the time t7 which is the end of TXOP2 1022.

The two dimensional NAV is represented by the box 1024 representing, at time t4, the time duration and frequency range within which STA2 is prohibited from transmitting. Upon receiving the first PPDU 1034 of TXOP4 1036, STA2 determines that 1034 is an OBSS PPDU from BSS3 and it is not one of the recipient of PPDU 1034. Since the duration indicated in 1034 is shorter than the existing NAV duration, as per the NAV rule for updating the NAV duration, STA2 does not update the NAV duration. However, since the bandwidth of PPDU 1034 is wider than the current NAV BW field, the BW field is updated to 80 MHz as shown by 1026 and is maintained as 80 MHz till time t7.

From time t6 to time t7, the actual ongoing OBSS transmission is only on BSS2 but the NAV BW field indicates 80 MHz. This can be seen as an over-protection zone 1028 whereby STA2 is restricted from transmitting on channels CH3 and CH4 which fall within zone 1028 even though both of the channels are idle for STA2 from time t6 to time t7. However, in the cases where the OBSS transmission is in a narrower bandwidth channels, even with Option 1, more efficient reuse of the secondary channels as compared to the existing UL MU CS mechanism is possible. At time t7, when the basic NAV duration counts down to zero, the NAV BW field is also reset to zero.

Figure 10B:
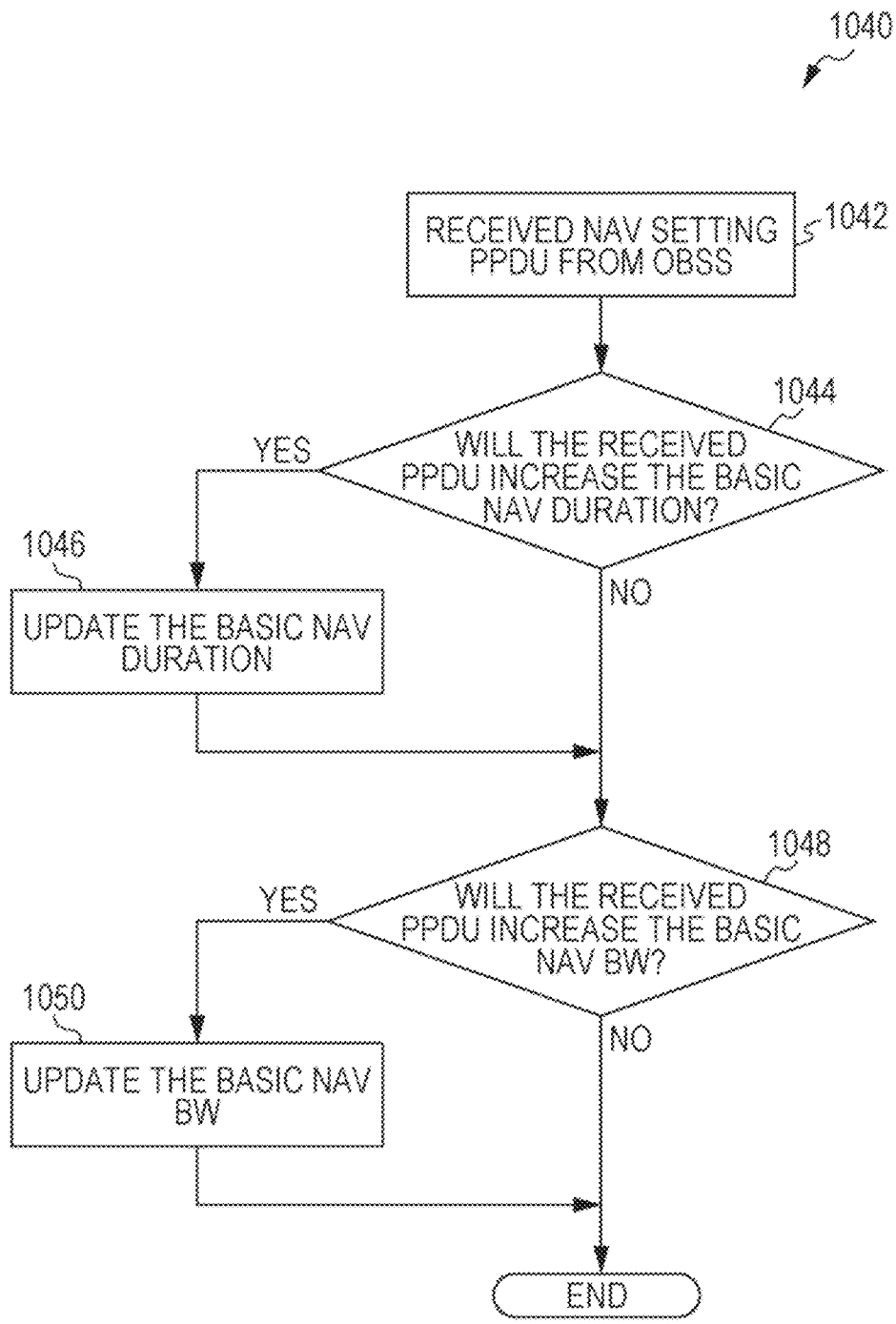
FIG. 10B is a flowchart illustrating the basic NAV update rule in the presence of multiple OBSSs as per the first embodiment.

The update rule for the NAV as per Option 1 is summarized by the flow chart 1040 in FIG. 10B. The process starts at step 1042 when a NAV setting PPDU is received. At step 1044, if the PPDU causes the duration field of the basic NAV to increase, the process moves to step 1046. At step 1046, the basic NAV duration is updated according to the relevant duration information in the PPDU (e.g. based on the TXOP duration field in the PHY header, or the duration field in the MAC header) and the process moves to step 1048. At step 1044, if the PPDU does not cause the duration field of the basic NAV to be increased, the process moves to step 1048. At step 1048, if the received PPDU causes the BW field to be increased, the process moves to step 1050 else the process ends. At step 1050, the BW field of the basic NAV is updated to reflect the bandwidth of the received PPDU and the process ends.

Figure 11A:
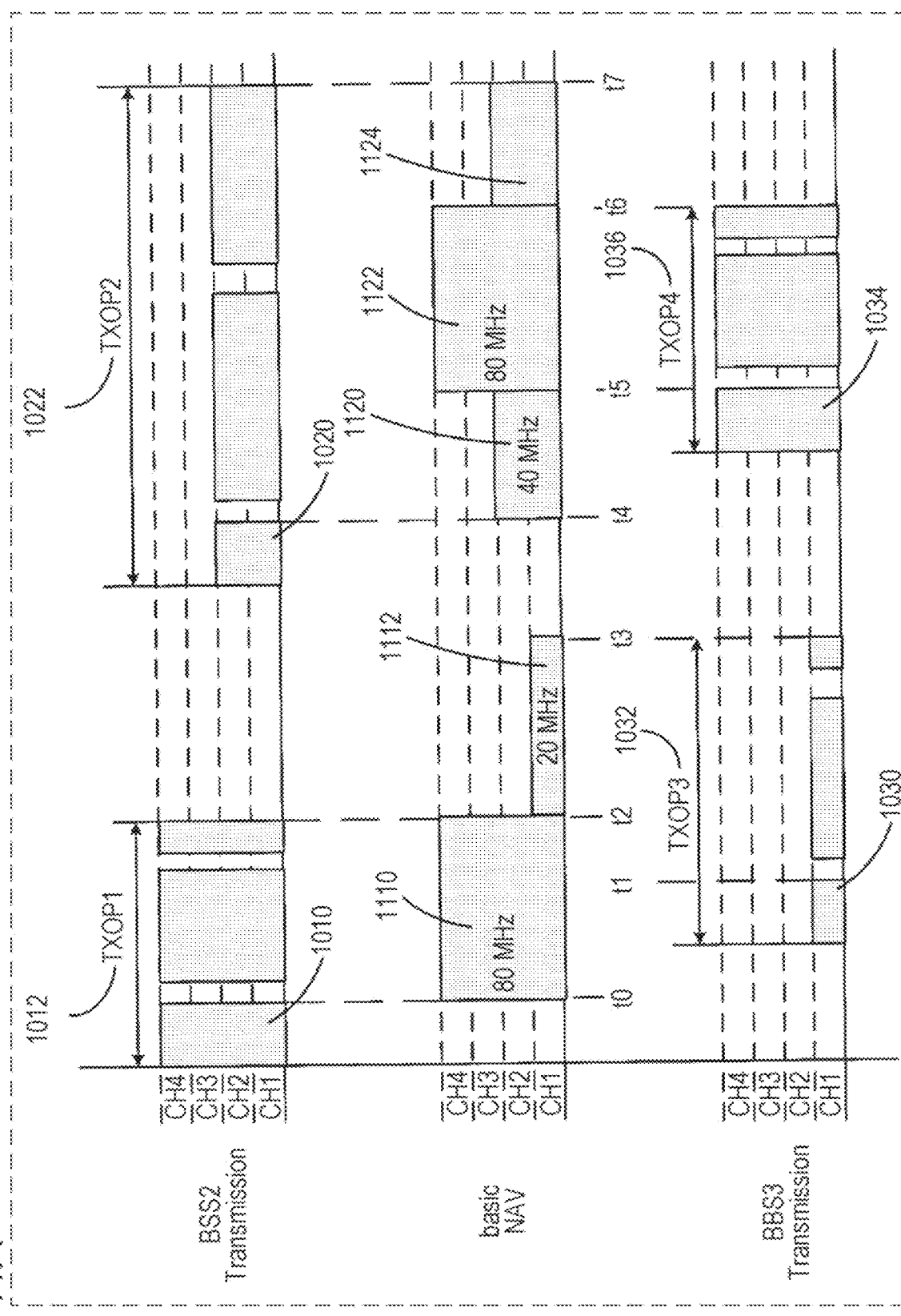
FIG. 11A is an example of frame exchange sequences illustrating an alternate rule for the basic NAV update in the presence of multiple OBSSs as per the first embodiment.

Referring to FIG. 11A, the same example transmission sequence shown in FIG. 10A are re-used to provide a visual illustration of the above mentioned option 2 (dynamic update) rules for the bandwidth field of STA2's basic NAV. Upon receiving the first PPDU 1010 of the TXOP1 1012, based on the BSS Color field in the PHY header or the BSSID field in the MAC header, STA2 determines that 1010 is an OBSS PPDU from BSS2 and it is not one of the recipient of the PPDU 1010. As per the existing NAV rule for updating the NAV duration, STA2 sets the NAV duration from time t0 to time t2, and the NAV BW field as 80 MHz, the bandwidth of the received PPDU 1010, prohibiting STA2 from transmitting on CH1, CH2, CH3 and CH4 till the time t2 which is the end of TXOP1 1012.

The two dimensional NAV is represented by the box 1110 representing, at time t0, the time duration and frequency range within which STA2 is prohibited from transmitting. Upon receiving the first PPDU 1030 of TXOP3 1032, STA2 determines that 1030 is an OBSS PPDU from BSS3 and it is not one of the recipient of the PPDU 1030. Since the duration indicated in 1030 is longer than the existing NAV duration, as per the NAV rule for updating the NAV duration, STA2 should update the NAV duration until time t3. However, from time t2 to time t3, the actual ongoing OBSS transmission is only on BSS3 and as such before the NAV duration is updated until t3, the end time of current NAV duration t2 is recorded as a temporary variable BW_update_time and a timer (BW_update_timer) is set to expire at BW_update_time. Since the bandwidth of PPDU 1030 is 20 MHz and is narrower than the current NAV BW field, no changes are made to the NAV BW field but the bandwidth of PPDU 1030 is saved as a temporary variable New_BW. When the BW_update_timer expires at t2, the NAV BW field is updated to New_BW (20 MHz) which represents the actual bandwidth 1112 of the ongoing third party transmission 1032.

As a result, the basic NAV does not restrict STA2 from transmitting on any of channels CH2, CH3 and CH4 within time t2 to time t3 since all the three channels are idle for STA2. Similarly, upon receiving the first PPDU 1020 of the TXOP2 1022, STA2 determines that 1020 is an OBSS PPDU from BSS2 and it is not one of the recipient of the PPDU 1020. As per the existing NAV rule for updating the NAV duration, STA2 sets the NAV duration from time t4 to time t7 and the NAV BW field as 40 MHz, the bandwidth of the received PPDU 1020, prohibiting STA2 from transmitting on CH1 and CH2 till the time t7 which is the end of TXOP2 1022. The two dimensional NAV is represented by the box 1024 representing, at time t4, the time duration and frequency range within which STA2 is prohibited from transmitting.

Upon receiving the first PPDU 1034 of TXOP4 1036, STA2 determines that 1034 is an OBSS PPDU from BSS3 and it is not one of the recipient of the PPDU 1034. Since the duration indicated in the PPDU 1034 is shorter than the existing NAV duration, as per the NAV rule for updating the NAV duration, STA2 does not update the NAV duration. However, since the bandwidth of PPDU 1034 is 80 MHz and is wider than the current NAV BW field, the BW field should be updated to 80 MHz as shown by 1122. However, from time t6 to time t7, the bandwidth of the ongoing OBSS transmission 1022 is only 40 MHz and as such before the NAV BW field is updated to 80 MHz, the current NAV BW is saved as New_BW and the end time t6 of BSS3 transmission 1036 is recorded as BW_update_time and a timer (BW_update_timer) is set to expire at BW_update_time. When the BW_update_timer expires at time t6, the NAV BW field is updated to New_BW (40 MHz) which represents the actual bandwidth 1124 of the ongoing third party transmission 1022. As a result, the basic NAV does not restrict STA2 from transmitting on any of channels CH3 and CH4 within time t6 to time t7 since both channels are idle for STA2.

Figure 11B:
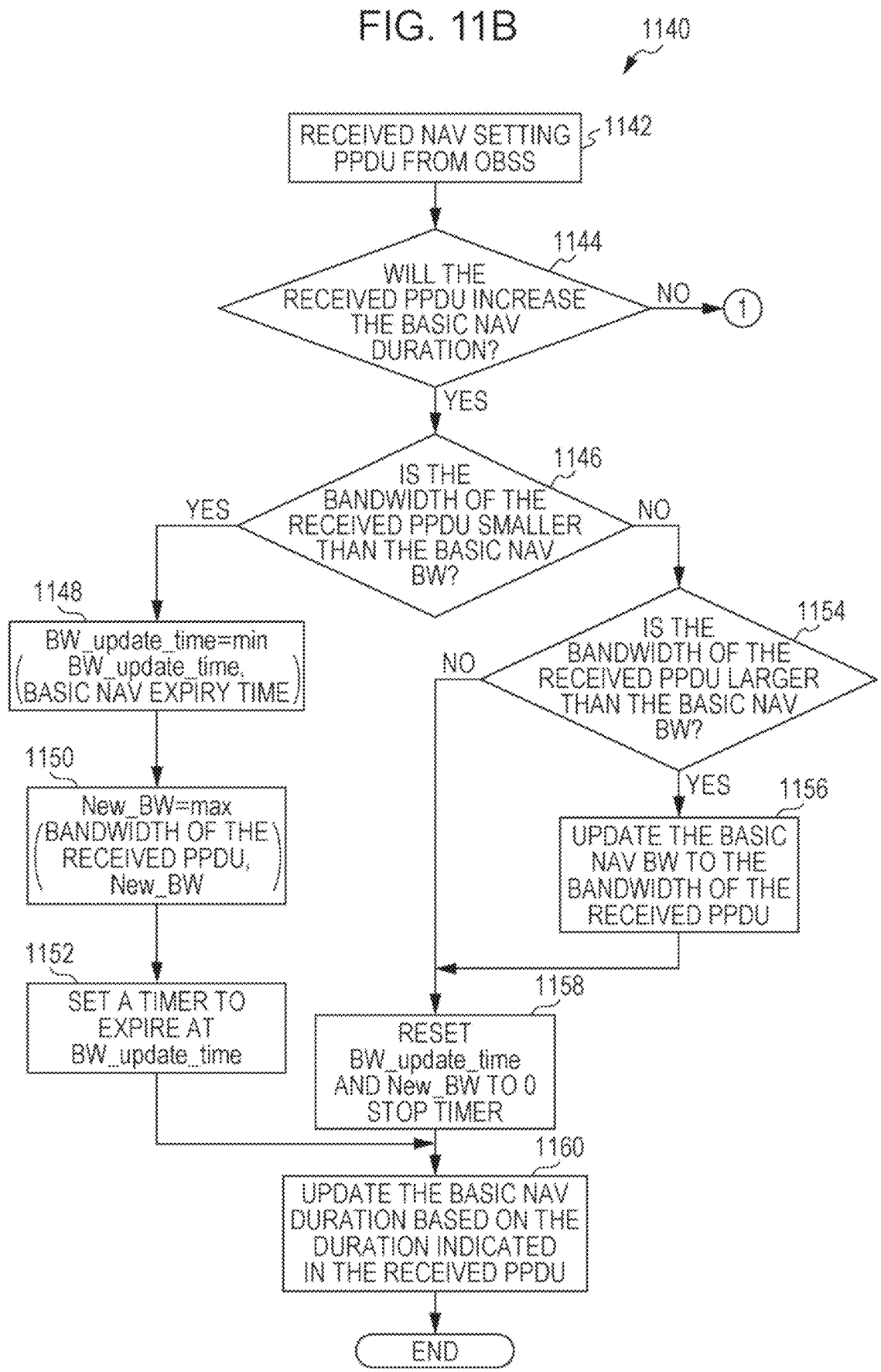
FIG. 11B is one part of a flowchart illustrating the alternate rule for the basic NAV update in the presence of multiple OBSSs as per the first embodiment.
Figure 11C:
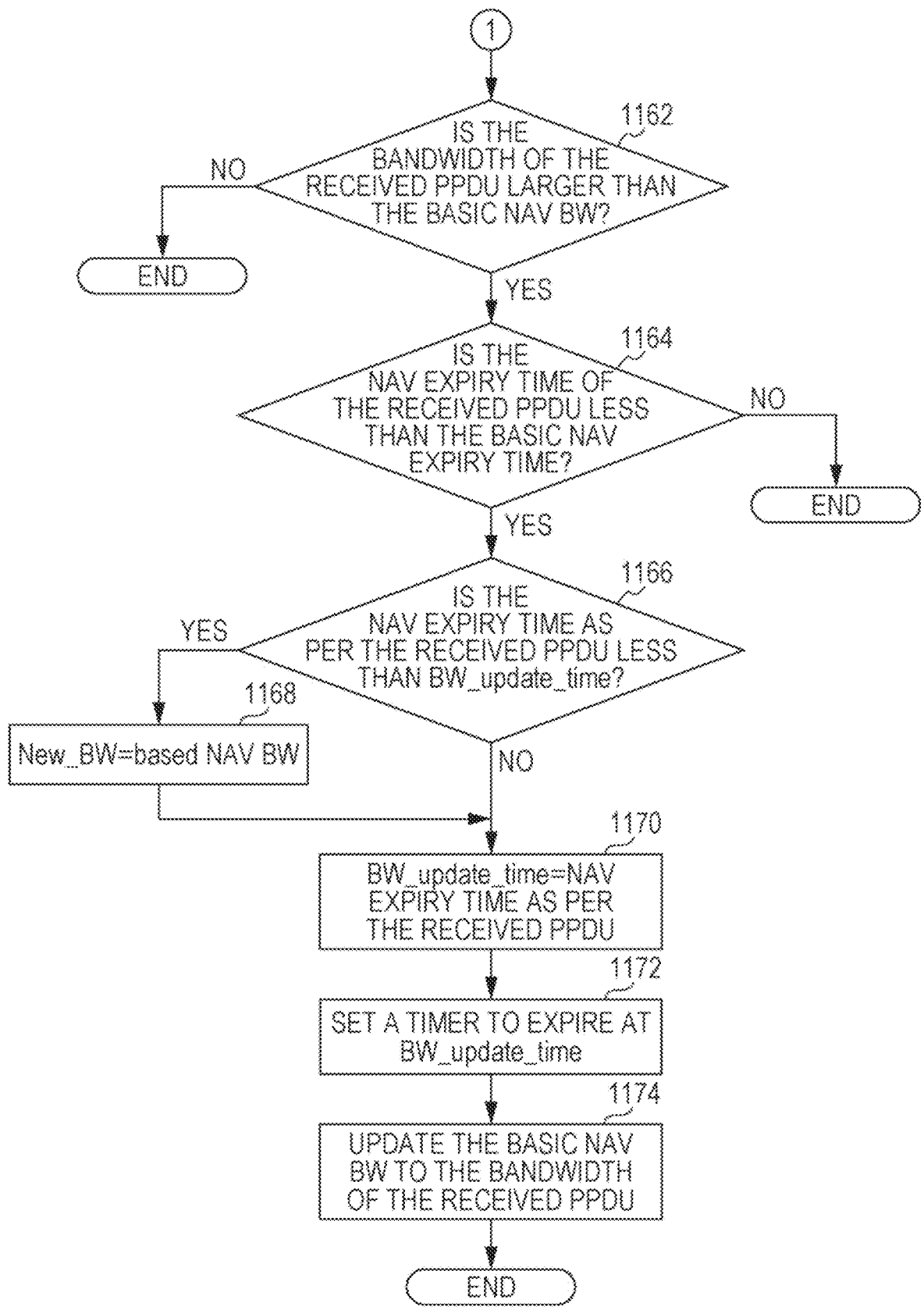
FIG. 11C is the other part of the flowchart illustrating the alternate rule for the basic NAV update in the presence of multiple OBSSs as per the first embodiment.
Figure 11D:
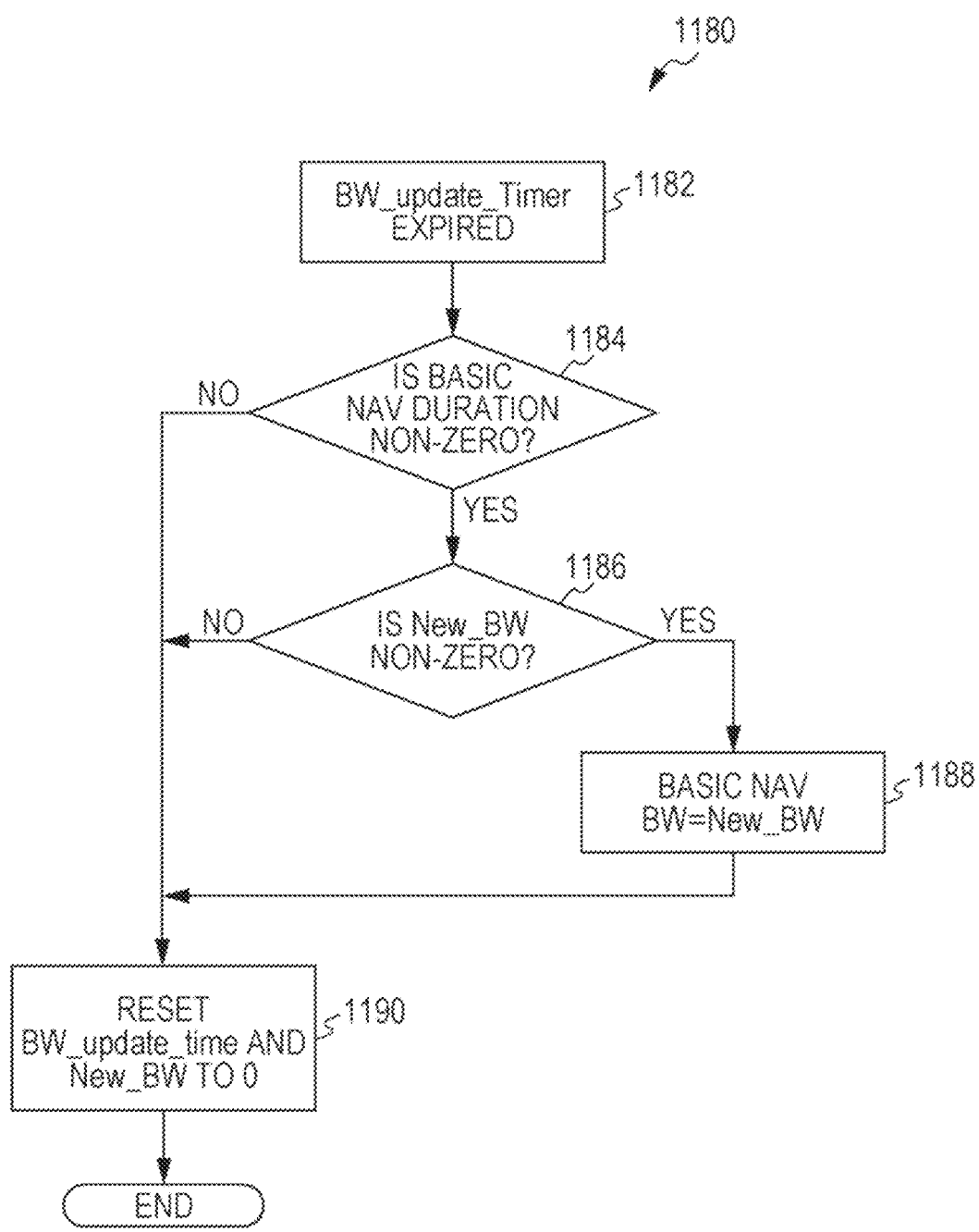
FIG. 11D is another flowchart illustrating the alternate rule for the basic NAV update in the presence of multiple OBSSs as per the first embodiment.

The update rule for the NAV as per Option 2 is summarized by the flow charts 1140 in FIGS. 11B and 11C and 1180 in FIG. 11D. The process starts at step 1142 when a NAV setting PPDU is received. At step 1144, if the PPDU causes the duration field of the basic NAV to increase, the process moves to step 1146, else the process moves to step 1162. At step 1146, if the bandwidth of the received PPDU is smaller than the basic NAV BW field, the process moves to step 1148, else the process moves to step 1154. At step 1148, if the variable BW_update_time is zero, the expiry time of the current basic NAV is stored in the variable BW_update_time, else if the variable BW_update_time is non-zero, the lesser of the two values, BW_update_time or the expiry time of the current basic NAV, is stored in BW_update_time and the process moves to step 1150. At step 1150, the larger of the two values, New_BW or the bandwidth of the received PPDU, is stored in the variable New BW and the process moves to step 1152.

At step 1152, a timer called the BW_update_timer is set to expire at BW_update_timer and the process moves to step 1160. At step 1154, if the bandwidth of the received PPDU is larger than the basic NAV BW field, the process moves to step 1156, else the process moves to step 1158. At step 1156, the basic NAV BW field is updated to the bandwidth of the received PPDU and the process moves to step 1158. At step 1158, since the bandwidth of the basic NAV is not expected to change till the end of the basic NAV duration, the BW_update_timer, if running, is stopped and both BW_update_time and New_BW are set to 0 and the process moves to step 1160. At step 1160, the basic NAV duration is updated according to the relevant duration information in the PPDU (e.g. based on the TXOP duration field in the PHY header, or the duration field in the MAC header) and the process 1140 ends.

At step 1162, if the bandwidth of the received PPDU is larger than the basic NAV BW field, the process moves to step 1164, else the process 1140 ends. At step 1164, if the NAV expiry time as per the received PPDU is less than the expiry time of the basic NAV, the process moves to step 1168, else the process moves to step 1170. At step 1168, the value of the basic NAV BW field is stored in the variable New_BW and the process moves to step 1170. At step 1170, the NAV expiry time as per the received PPDU is stored in the variable BW_update_time and the process moves to step 1172. At step 1172, the BW_update_timer is set to expire at BW_update_timer and the process moves to step 1174. At step 1174, the basic NAV BW field is updated to the bandwidth of the received PPDU and the process 1140 ends.

The basic NAV BW adjustment process is summarized by process 1180. The process 1180 starts at step 1182 when the BW_update_timer expires. At step 1184, if the basic NAV duration is non-zero, the process moves to step 1186, else the process moves to step 1190. At step 1186, if the value of New_BW is non-zero, the process moves to step 1188, else the process moves to step 1190. At step 1188, the BW field of the basic NAV is updated to New_BW and the process 1180 ends. At step 1190, both BW_update_time and New_BW are set to 0 and the process 1180 ends.

Referring to FIG. 12, table 1200 lists the possible values and the meanings of the channel-list parameter of the PHY-CCA.indication primitive used by HE STAs. The PHY-CCA.indication(STATE,{channel-list}) primitive is used by the PHY layer of HE STAs to indicate the condition of the channels to the MAC layer. The PHY-CCA.indication primitive always includes a STATE parameter but only includes the channel-list parameter when the STATE parameter is BUSY and conditions of multiple channels are reported. The PHY-CCA.indication primitive indicates, within the BSS operating bandwidth, which channels are busy and which channels are idle. The first four values of the channel-list parameters and their meaning are the same as defined in the IEEE 802.11 specification, while the three values primary20, primary40 and primary80, as listed on row 1210, 1220 and 1230 respectively, have been added by the first embodiment of the present disclosure. Referring to FIG. 3B, a value of "primary" for the channel-list parameter indicates that the primary 20 MHz channel 310, as well as all other nonprimary channels, is busy.

A value of "secondary" indicates that the secondary 20 MHz channel 320 is busy while the primary 20 MHz channel 310 is idle. A value of "secondary40" indicates that the secondary 40 MHz channel (330 and 340) is busy while the primary 20 MHz channel 310 and the secondary 20 MHz channel 320 are idle. A value of "secondary80" indicates that the secondary 80 MHz channel (350, 360, 370 and 380) is busy while the primary 20 MHz channel 310, the secondary 20 MHz channel 320, and the two 20 MHz channels 330 and 340 that together form the secondary 40 MHz channel, are idle. As mentioned earlier, a value of "primary" for the channel-list parameter indicates that the primary 20 MHz channel, as well as all other nonprimary channels that form a part of the BSS operating channel, is busy. In legacy 802.11 systems, all transmissions in an infrastructure BSS includes the primary 20 MHz channel, and an STA is not allowed to transmit as long as the primary 20 MHz channel is busy.

As such, in legacy 802.11 BSS, a busy primary 20 MHz channel is considered equivalent to all nonprimary channels being busy as well. However, in the case of uplink OFDMA based multi-user transmission in an 802.11ax BSS, an STA may be allowed to transmit their uplink PPDU on a channel that does not include the primary 20 MHz channel if the AP allocates RU for the STA on a nonprimary channel. As an example, referring to FIG. 4, in the Trigger frame 410, the AP allocates RU for STA3 on the secondary channel CH2 and as per the 802.11ax UL MU transmission rule, STA3 is allowed to transmit its UL PPDU 440 on the secondary channel CH2 if the UL MU CS considers CH2 to be idle. In order to enable a STA's PHY layer to report the condition of the nonprimary channels when the primary channel is busy, three additional values (primary20, primary40 and primary80) are added to the PHY-CCA.indication primitive. A value of "primary20" indicates that the primary 20 MHz channel 310 is busy while the rest of the nonprimary channels are all idle. A value of "primary40" indicates that the primary 40 MHz channel (310, 320) is busy while the rest of the nonprimary channels are all idle. A value of "primary80" indicates that the primary 80 MHz channel (310, 320, 330, and 340) is busy while the rest of the nonprimary channels are all idle.

As an example, referring to FIG. 7A, when PPDU 710 is received, the receiving STA's PHY layer issues a PHY-CCA.indication(BUSY,{primary}) primitive to the MAC layer to indicate that all the four 20 MHz channels are busy, Subsequently, when PPDU 720 is received, PHY-CCA.indication(BUSY,{primary40}) primitive is issued to indicate that the primary 20 MHz channel CH1 and the secondary 20 MHz channel CH2 are busy while channels CH3 and CH4 are idle. Similarly, when PPDU 730 is received, PHY-CCA.indication(BUSY,{primary20}) primitive is issued to indicate that the primary 20 MHz channel is busy while channels CH2, CH3 and CH4 are idle. The STA's MAC layer uses the information from the PHY-CCA.indication primitive to correctly set the BW field of the NAV.

<Second Embodiment>

Figure 13A:
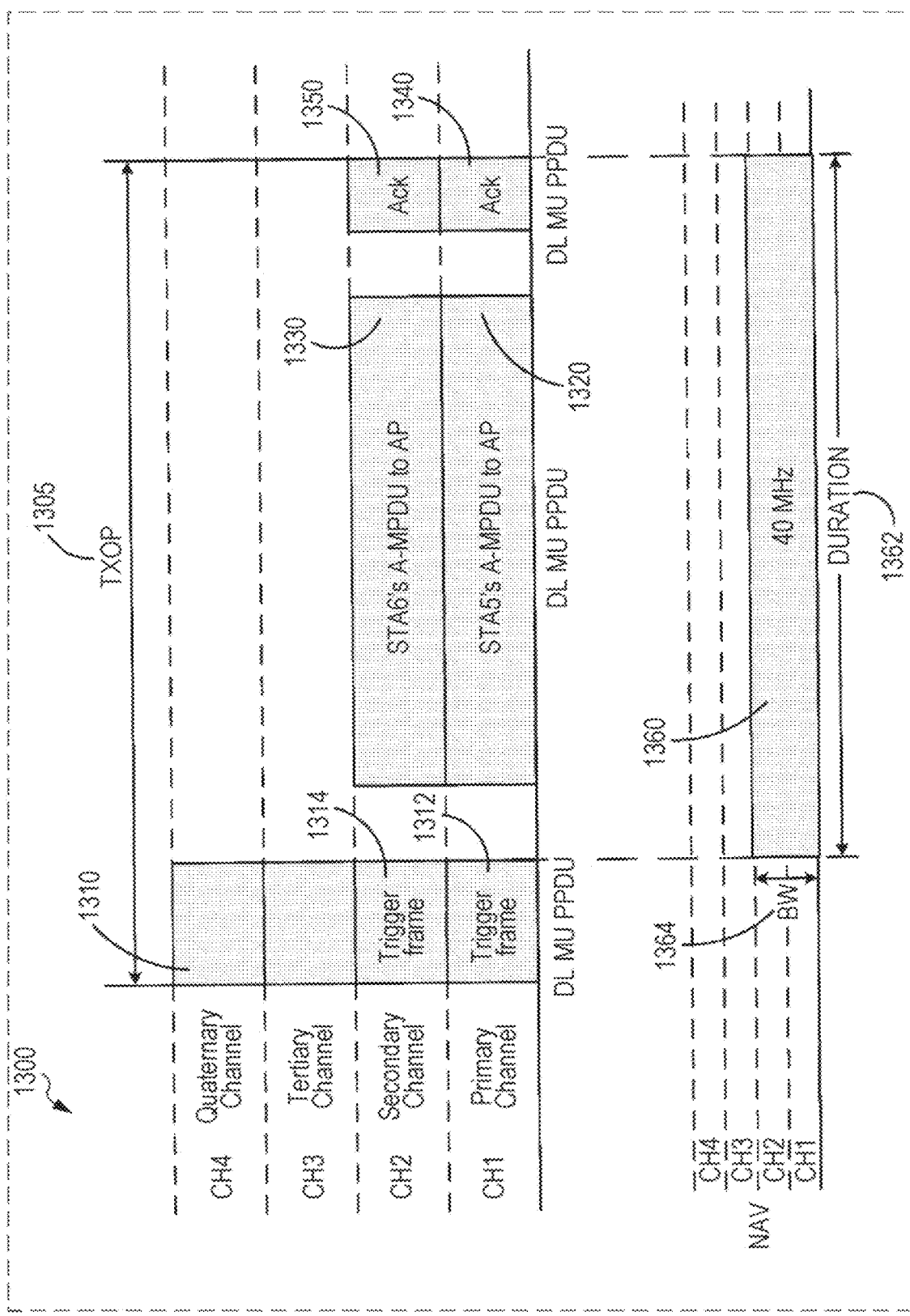
FIG. 13A is an example UL MU transmission illustrating the second embodiment of the present disclosure.

Referring to FIG. 13A, the example uplink multi-user transmission sequence 1300 illustrates the case where the bandwidth of the PPDUs changes during the same TXOP 1305. The AP2 102 in FIG. 1 transmit a 80 MHz DL MU PPDU 1310 that, aside from other frames, contains two unicast Trigger frames 1312 and 1314 addressed to STA5 150 and STA6 160 respectively. The Trigger frame 1312 allocates RU on the primary channel CH1 for STA5, while the Trigger frame 1314 allocates RU on the secondary channel CH2 for STAG. AP2 102 also protects the subsequent uplink transmissions by setting either the TXOP duration in the PHY header of the PPDU 1310, or the Duration field in the MAC header of the individual frames carried by the PPDU 1310, till the end of TXOP 1305. SIFS after the end of the PPDU 1310, STA5 transmits its UL PPDU 1320 on CH1 while STA6 transmits its UL PPDU 1330 on CH2.

The AP concludes the frame exchange by transmitting a DL MU PPDU carrying the Ack frames 1340 and 1350 to STA5 and STA6 respectively. If an OBSS STA, for example STA2 120 in FIG. 1, received the PPDU 1310, STA2 determines that the PPDU 1310 is an OBSS PPDU from BSS2 145, STA2 sets the basic NAV duration 1362 till the end of TXOP 1305 based on the duration information in PPDU 1310. However, if STA2 is able to decode the individual frames within the MU PPDU 1310, STA2 is able to predict the bandwidth of the subsequent uplink transmission. For example, by decoding the Trigger frames 1314 and 1312, STA2 is able to figure out that RUs are assigned for uplink only on CH1 and CH2. As such STA2 can predict that the subsequent uplink transmission triggered by the PPDU 1310 will only cover CH1 and CH2. As such, instead of setting the BW field of the basic NAV to 80 MHz which is the bandwidth of PPDU 1310, as per the second embodiment, STA2 sets the BW field 1364 to 40 MHz, the predicted bandwidth of the subsequent uplink transmission. This provides opportunity for STA2 to utilize the idle secondary channels CH3 and CH4 for its own uplink transmission. The two dimensional basic NAV is visually illustrated by the rectangle 1360.

Figure 13B:
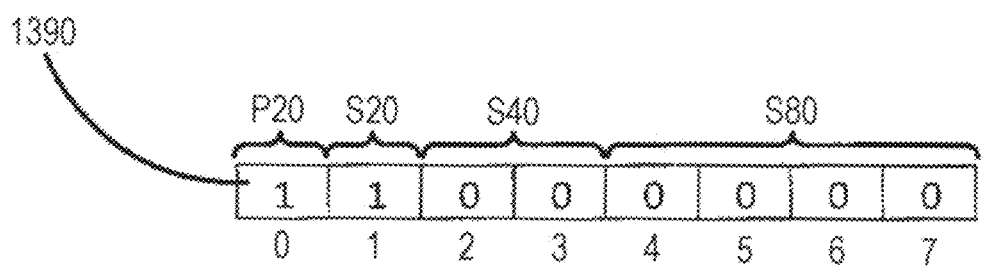
FIG. 13B is a diagram of a bitmap used to record the channel status as per the second embodiment of the present disclosure.

Referring to FIG. 13B, the BW field of the NAV can be stored as an 8-bit bitmap 1390, 1 bit per 20 MHz channel. Using 8 bits, the condition of all 20 MHz channels used in an 802.11 BSS operating in up to 160 MHz channel can be recorded. The busy state of a channel is recorded by setting the corresponding bit to 1, while an idle state is represented by 0.

Figure 14:
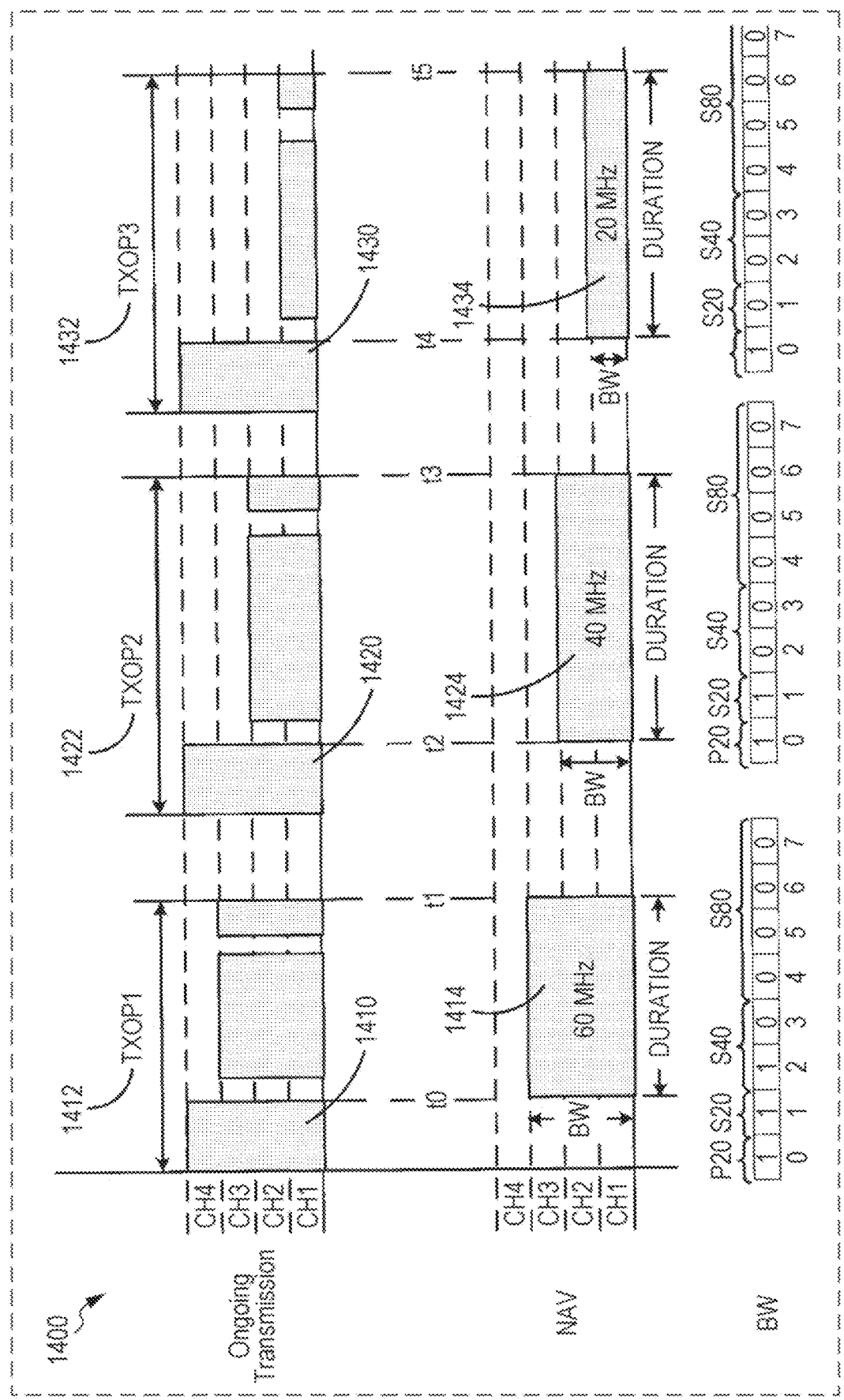
FIG. 14 is an example of frame exchange sequences illustrating the multi-channel virtual carrier sensing (CS) introduced in the second embodiment.

Referring to FIG. 14, a series of example frame exchange sequences are shown to provide a visual illustration of the two dimensional NAV as per the second embodiment in an 80 MHz BSS. The top half depicts three transmission sequences with variable bandwidths: TXOP1 1412, TXOP2 1422 and TXOP3 1432. Each transmission sequence comprises an exchange of PPDUs between an AP and one or more STAs that belong to the same BSS as the AP. As an example, the first PPDU in the transmission sequence can be a Trigger frame allocating RUs for UL MU transmission to selected STAs, followed by HE trigger-based PPDUs from the STAs and ending with DL PPDU from the AP carrying acknowledgment frames. In this example, CH1, CH2, CH3 and CH4 denote the primary, secondary, tertiary and quaternary 20 MHz channels. The bottom half of the example depicts the visual representation of the two dimensional NAV maintained by a third party STA as proposed by the present disclosure. The bitmap used to record the BW field of the NAV is also illustrated. The points in time relevant to this example are denoted by t0, t1, t2, t3, t4 and t5. Any STA that is within the radio coverage of an ongoing transmission and is neither a transmitter nor a recipient of the transmission is considered a third party STA for that transmission.

Upon receiving the first PPDU 1410 of TXOP1 1412, a third party STA determines that it is not a recipient of the PPDU 1410, for example, by reading the receiver address in the MAC header of the frames carried by the PPDU, or by reading the AID12 subfield of the User Info field of the Trigger frame carried in the PPDU 1410 etc. Once the STA has determined that it is not a recipient of the PPDU 1410, as per the existing NAV rule, it sets the NAV duration from t0 to t1. In addition to recording the NAV duration, as per the second embodiment, the STA decodes the trigger frame in the PPDU 1410 and determines that RUs have been allocated for subsequent uplink transmissions on CH1, CH2 and CH3. Based on this, in the BW field of the NAV, the STA sets the bit 0, bit 1 and bit 2 to 1 (busy), and rest of the bits to 0 (idle). The two dimensional NAV is represented by the box 1414 prohibiting the STA from transmitting on CH1, CH2 and CH3 till the time t1 which is the end of TXOP1 1412.

Similarly, upon receiving PPDU 1420, the STA sets the NAV duration till time t3 which is the end of TXOP2 1422. The STA decodes the trigger frame in the PPDU 1420 and determines that RUs have been allocated for subsequent uplink transmissions on CH1 and CH2. Based on this, in the BW field of the NAV, the STA sets the bit 0 and bit 1 to 1 (busy), and rest of the bits to 0 (idle). This is illustrated as the box 1424 prohibiting the STA from transmitting on CH1 and CH2 till the time t3.

In the same way, upon receiving the PPDU 1430, the STA sets the NAV duration till time t5 which is the end of TXOP3 1432. The STA decodes the trigger frame in the PPDU 1430 and determines that RUs have been allocated for subsequent uplink transmissions on CH1. Based on this, in the BW field of the NAV, the STA sets the bit 0 to 1 (busy) and rest of the bits to 0 (idle). This is illustrated as the box 1434 prohibiting the STA from transmitting on CH1 till the time t5. In this case, the third party STA may be allowed to transmit on the unoccupied channels CH2, CH3 and CH4 within the NAV duration from t4 till t5 without causing interference to the ongoing transmission 1432.

<Configuration of a STA>

Figure 15:
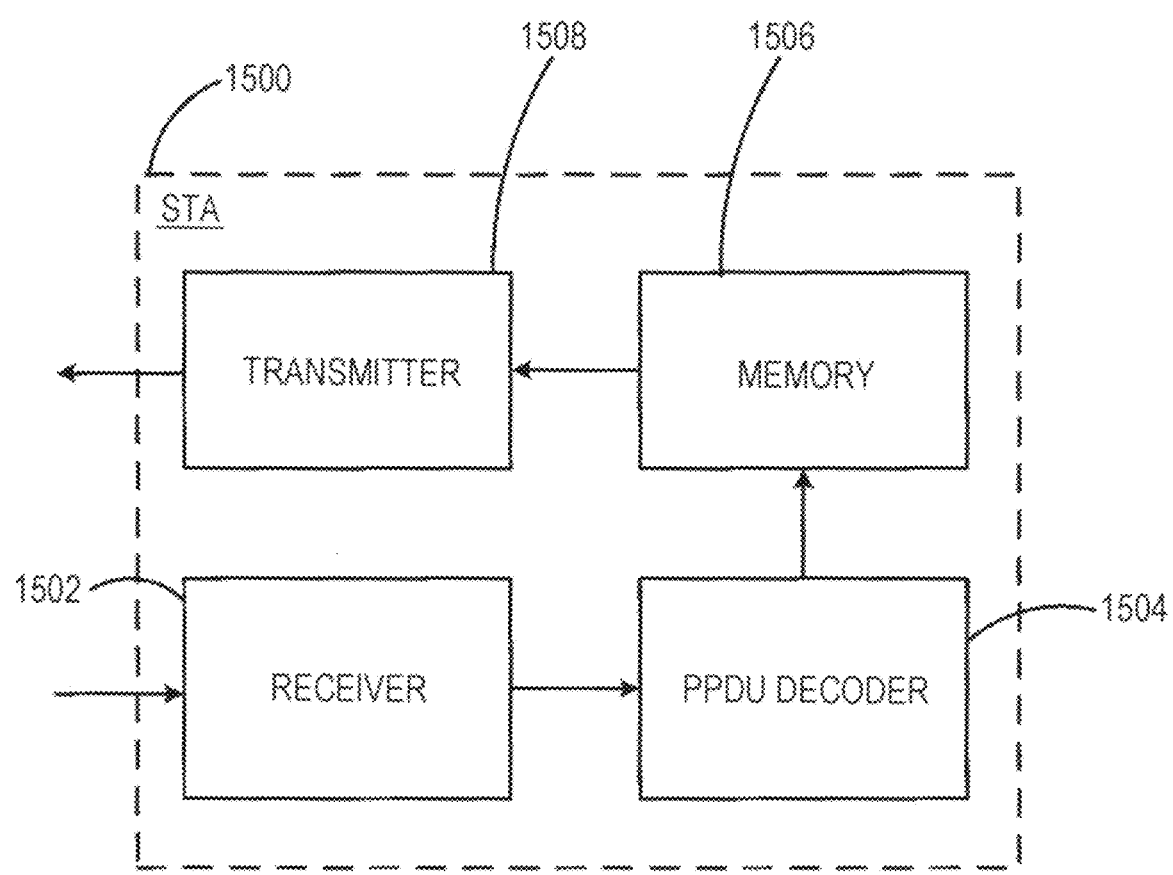
FIG. 15 is a simplified block diagram of an example STA that implements the disclosed multi-channel virtual carrier sensing.

FIG. 15 is a block diagram of an example STA 1500 that implements the two dimensional NAV described in the present disclosure. The device may be any one of the STAs in FIG. 1. The STA 1500 comprises a receiver 1502, a PPDU decoder 1504, a memory 1506 and a transmitter 1508.

The receiver 1502 receives PPDUs from other wireless devices within its radio coverage area. The PPDU decoder 1504 inspects each received PPDU to determine whether the PPDU is transmitted by a STA that belongs to the STA's corresponding BSS, or if the PPDU is transmitted by an OBSS STA. The PPDU decoder 1504 also determines whether the STA is an intended recipient of the PPDU; if it is not, the PPDU decoder further extracts the duration information from either the PHY header of the PPDU or from the MAC header of a frame carried in the PPDU. The PPDU decoder also determines the bandwidth occupied by the received PPDU.

The STA 1500 may comprise of one or more instances of the memory 1506. The memory 1506 records the duration information carried in the received PPDU and if applicable, the bandwidth occupied by the PPDU. If the PPDU decoder determines that the received PPDU is transmitted by a STA from its corresponding BSS, the memory 1506 only records the duration information as intra-BSS NAV. However, if the PPDU decoder determines that the received PPDU is transmitted by an OBSS STA, the memory 1506 records both the duration information and the bandwidth information as part of the basic NAV. The transmitter 1508, when instructed, transmits on frequency channels other than those indicated by the bandwidth information of the basic NAV without causing interference on the channels indicated by the basic NAV bandwidth.

Figure 16:
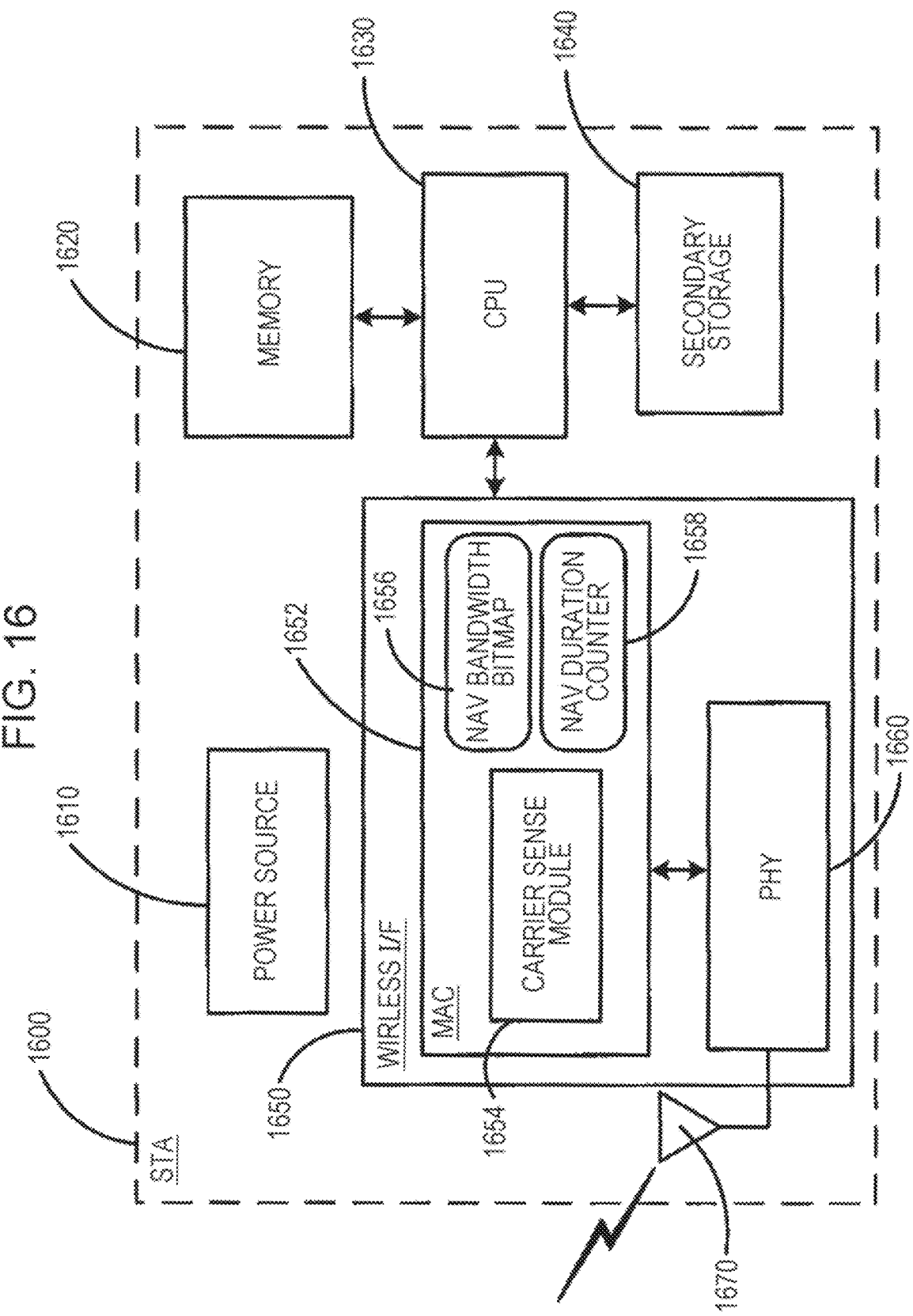
FIG. 16 is a detailed block diagram of an example STA that implements the disclosed multi-channel virtual carrier sensing.

FIG. 16 is a detailed block diagram of an example STA 1600 that that implements the two dimensional NAV described in the present disclosure and may be any one of the STAs in FIG. 1. The wireless device 1600 comprises a Central Processing Unit (CPU) 1630 coupled to a memory 1620, a secondary storage 1640 and to one or more wireless communication interfaces 1650. The secondary storage 1640 may be a non-volatile computer readable storage medium that is used to permanently store pertinent instruction codes, data etc. At the time of start up, the CPU 1630 may copy the instruction codes as well as related data to the volatile memory 1620 for execution. The instruction code may be an operating system, user applications, device drivers, execution codes etc. which are required for the operation of the STA 1600. The STA 1600 may also comprise a power source 1610 for example a lithium ion battery or a coin cell battery etc. or it may also be Mains electricity.

The wireless communication interface 1650 may comprise an interface for cellular communication, or an interface for short range communication protocols such as Zigbee, or it may be a WLAN interface. The Wireless interface 1650 may further comprise a MAC module 1652, a PHY module 1660 and an antenna 1670. Among other sub-modules, the MAC module 1652 may comprise a Carrier Sense module 1654, a NAV bandwidth bitmap 1656 and a NAV duration counter 1658. The NAV bandwidth bitmap 1656 and the NAV duration counter 1658 are used to record the bandwidth and the duration information contained in a received PPDU if the STA 1600 is not an intended recipient of the PPDU. The Carrier Sense module 1654 is responsible for performing both the physical carrier sense (Energy Detect) as well as the virtual carrier sense (NAV) prior to any transmission that requires carrier sensing.

The STA 1600 may comprise many other components that are not illustrated, for sake of clarity, in FIG. 16. Only those components that are most pertinent to the present disclosure are illustrated.

<Third Embodiment>

In the previous embodiments, the bandwidth information of the PPDU that sets the NAV was recorded as a field of the NAV itself. However, it is also possible that the bandwidth information is de-coupled from the NAV and is recorded separately. As per the third embodiment, a STA records the bandwidth information of the PPDU that sets the NAV as a separate entity, for example, as an OBSS_BW information field.

Figure 17:
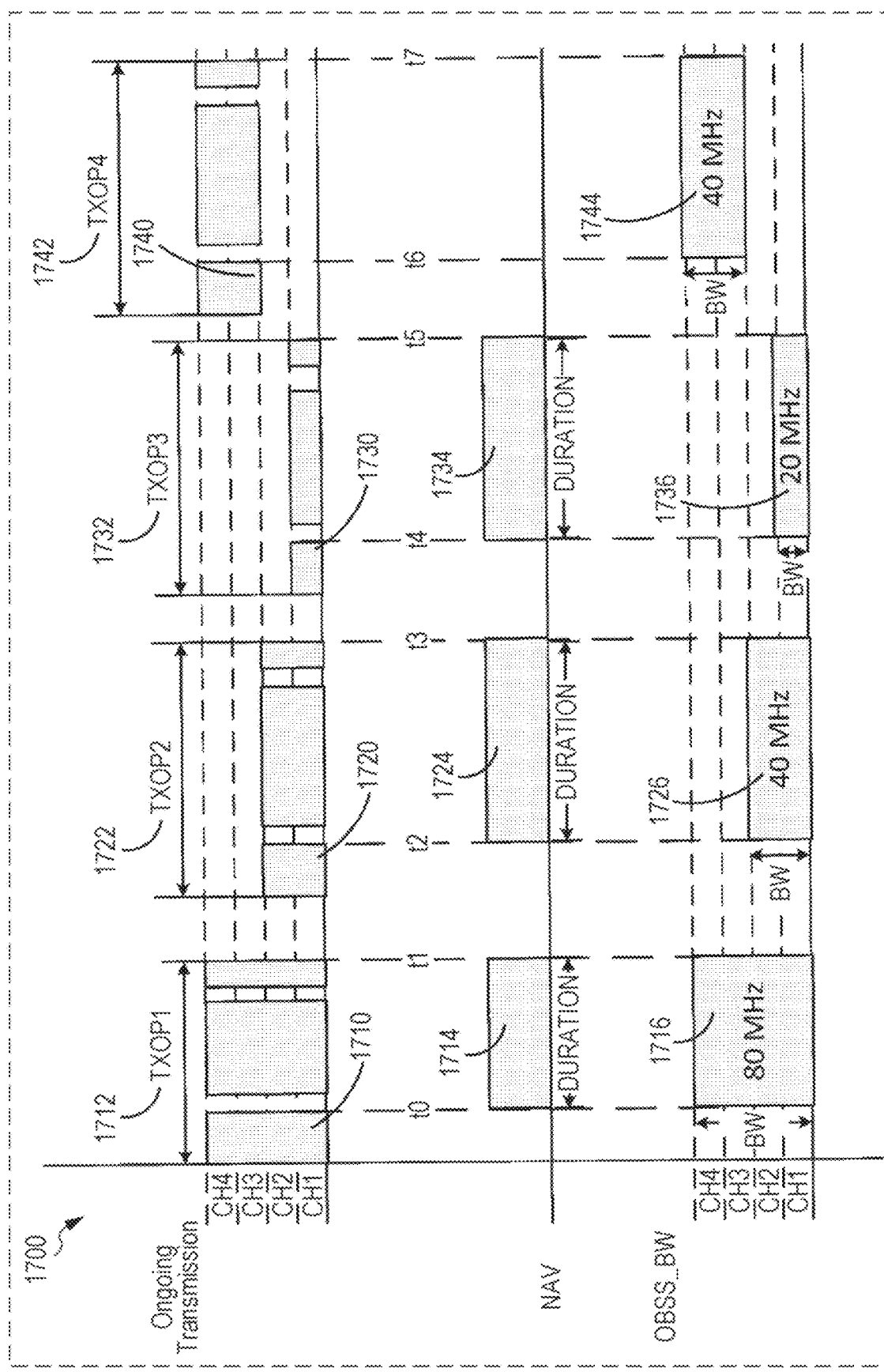
FIG. 17 is an example of frame exchange sequences illustrating the multi-channel virtual carrier sensing (CS) as per the third embodiment.

Referring to FIG. 17, a series of example frame exchange sequences 1700 are shown to provide a visual illustration of the recording of the bandwidth information as per the third embodiment in an 80 MHz BSS. The top portion of FIG. 17 depicts four transmission sequences with variable bandwidths: TXOP1 1712, TXOP2 1722, TXOP3 1732 and TXOP4 1742. Each transmission sequence comprises an exchange of PPDUs between an AP and one or more STAs that belong to the same BSS as the AP.

The middle portion of FIG. 17 depicts a visual representation of the NAV durations maintained by a third party STA as per the rules defined by the IEEE 802.11 specification. Any STA that is within the radio coverage of an ongoing transmission and is neither a transmitter nor an intended recipient of the transmission is considered a third party STA for that transmission. The bottom portion of FIG. 17 depicts a visual representation of OBSS_BW information as maintained by the same third party STA. Time points relevant to this example are denoted by t0, t1, t2, t3, t4, t5, t6 and t7.

Upon receiving the first PPDU 1710 of TXOP1 1712, a third party STA determines that the STA itself is not an intended recipient of the PPDU 1710, for example, by reading the receiver address in the MAC header of the frames carried by the PPDU, or by reading the AID12 subfield of the User Info field of the Trigger frame carried in the PPDU 1710 etc. Once the STA has determined that the STA itself is not an intended recipient of the PPDU 1710, as per existing IEEE 802.11 NAV rules, it sets the NAV duration to a time duration from time t0 to time t1, prohibiting the STA from transmitting till time t1 which is the end of TXOP1 1712. In addition to recording the NAV duration, as per the third embodiment, the STA also records the bandwidth information of the PPDU 1710 that sets the NAV, in the OBSS_BW information field as 80 MHz. At time t1, when the NAV duration 1714 counts down to zero, the OBSS_BW information field is also reset to zero. Box 1716 depicts OBSS_BW information between time t0 and time t1 OBSS_BW information field may be represented as a two bit variable as shown in table 750 in FIG. 7B, or it may also be maintained as an 8-bit bitmap 1390 in FIG. 13B.

Similarly, upon receiving the first PPDU 1720 of TXOP2 1722, the STA sets the NAV duration 1724 to a time duration from time t2 to time t3 which is the end of TXOP2 1722 while the OBSS_BW information field is set to 40 MHz, the bandwidth of the PPDU 1720; this is illustrated as the box 1726. At time t3, when the NAV duration 1724 counts down to zero, the OBSS_BW information field is also reset to zero. In the same way, upon receiving the first PPDU 1730 of TXOP3 1732, the STA sets the NAV duration 1734 to a time duration from time t4 to time t5 which is the end of TXOP3 1732, while the OBSS_BW information field is set to 20 MHz, the bandwidth of the PPDU 1730; this is illustrated as the box 1736. At time t5, when the NAV duration 1734 counts down to zero, the OBSS_BW information field is again reset to zero. If the channel sensing rules are also modified accordingly, under certain conditions, the third party STA may be allowed to transmit on the unoccupied channels CH3 and CH4 within the time duration from t2 till t3 as well as on channels CH2, CH3 and CH4 within the time duration from t4 to t5 without causing interference to the ongoing transmissions 1722 and 1732 respectively, thereby promoting more efficient re-use of the unoccupied secondary channels.

Traditionally, IEEE 802.11 STAs are only required to receive and decode a PPDU that overlaps a STA's primary 20 MHz channel; a STA is not required to receive or decode a PPDU that does not overlap its primary 20 MHz channel. However, if a STA has the ability to receive and decode such a PPDU, the STA may use the OBSS_BW information field to record the bandwidth of such PPDUs as well. TXOP4 1742 represent such a frame exchange sequence that does not overlap the primary 20 MHz used by the third party STA. Upon receiving the first PPDU 1740 of TXOP4 1742, if the STA has the capability to receive and decode the PPDU, the STA may record the bandwidth in the OBSS_BW information field. Note that in this case the STA does not set the NAV duration.

The bandwidth information recorded by OBSS_BW information field may also be used as a reference by the STA to inform its channel availability to the AP that the STA is associated with. As an example, if the STA implements the unsolicited Bandwidth Query Report (BQR) operation defined in the IEEE 802.11ax, it may use the OBSS_BW information field to populate the Available Channel bitmap that the STA sends to its associated AP in the Bandwidth Query Report. The TXOP4 1742 does not set the NAV duration for the STA and hence does not prevent the STA from transmitting. However, recording the bandwidth of TXOP4 1742 in the OBSS_BW information field enables the STA to report to its AP that CH3 and CH4 are expected to be busy for the STA during time duration from time t6 to time t7. This will help the AP to avoid CH3 and CH4 in any Resource Unit (RU) allocation to the STA for either downlink or uplink OFDMA transmission to/from the STA during time duration from time t6 to time t7.

Referring back to FIG. 5, the over-protective NAV that prohibited STA2 from transmitting the UL PPDU 450, may be overcome by applying the concept of recording the bandwidth information of the ongoing OBSS transmission from BSS2 145 in FIG. 1 as the OBSS_BW information field and at the same time making some changes to the Virtual CS rule and the UL MU CS mechanism.

Figure 18:
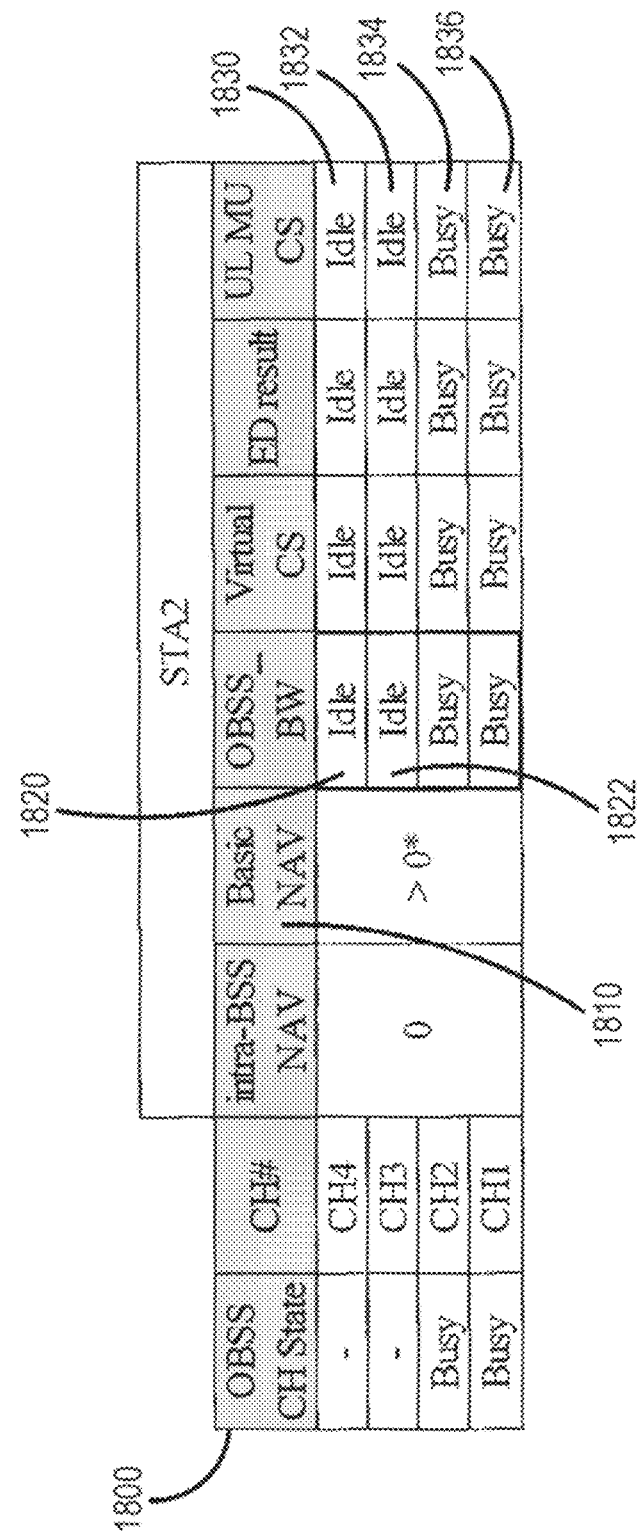
FIG. 18 is a table illustrating how the various parameters related to the UL MU CS mechanism are updated based on the modified multi-channel virtual CS rule as per the third embodiment.

The table 1800 in FIG. 18 lists the various parameters related to the modified UL MU CS mechanism for STA2 during the UL MU transmission sequence shown in FIG. 5. Table 1800 and its content is the same as that of table 880 in FIG. 8B, except that the OBSS_BW information field is provided independently from Basic NAV 1810 in Table 1800. Since the OBSS transmission from BSS2 145 only overlaps in CH1 and CH2, CH1 and CH2 are recorded as busy while CH3 and CH4 are recorded as idle in the OBSS_BW information field as indicated by the entries 1820 and 1822 in FIG. 18, respectively.

As per the third embodiment, the virtual CS rule is modified such that the busy/idle virtual CS state is considered per 20 MHz channel. When the basic NAV duration counter is non-zero, only those 20 MHz channels that are indicated as busy by the OBSS_BW information field are considered as busy by virtual CS. Similarly, the UL MU CS rule is also modified to consider the busy/idle state of the wireless medium on a per 20 MHz channel basis. As per the modified UL MU CS rule, since both the virtual CS and the energy detect (ED) based CCA indicate busy on CH1 and CH2 and idle on CH3 and CH4, the UL MU CS mechanism considers CH1 and CH2 as busy while CH3 and CH4 are considered as idle as indicated by the entries 1836, 1834, 1832 and 1830 respectively. Since both CH3 and CH4 are considered idle, as per the modified UL MU CS transmission rule, STA2 is allowed to transmit its UL PPDU 450 on the allocated RU on CH3 and CH4 thereby promoting more efficient use of the wireless medium. The virtual CS rule as per the third embodiment can be summarized as below:

For each 20 MHz channel containing the allocated RU for the STA's uplink transmission, a NAV is considered in virtual CS for a STA that is solicited by a Trigger frame for transmission unless one of the following conditions is met:
The NAV was set by an intra-BSS frame
The NAV duration counter is zero
The NAV duration counter is greater than zero but the 20 MHz channel is recorded as idle by the OBSS_BW information field.

If no NAV is considered, then the virtual CS indicates idle for the 20 MHz channel, else the virtual CS indicates busy for the 20 MHz channel.

The UL MU CS rule as per the third embodiment can be summarized as below:
If the CS Required subfield in the Trigger frame is set to 1, during the SIFS time after the Trigger frame, at least for each 20 MHz channel containing the allocated RU for the STA's UL MU transmission, the STA shall consider the status of the CCA using the appropriate energy detect (ED) rule as well as the virtual CS before UL MU transmission in response to the Trigger frame. The STA may transmit a HE trigger-based PPDU when the 20 MHz channels containing the allocated RUs in the Trigger frame are considered idle; if the STA detects that the 20 MHz channels containing the allocated RUs are not all idle, then the STA shall not transmit anything in the allocated RUs.

Figure 19:
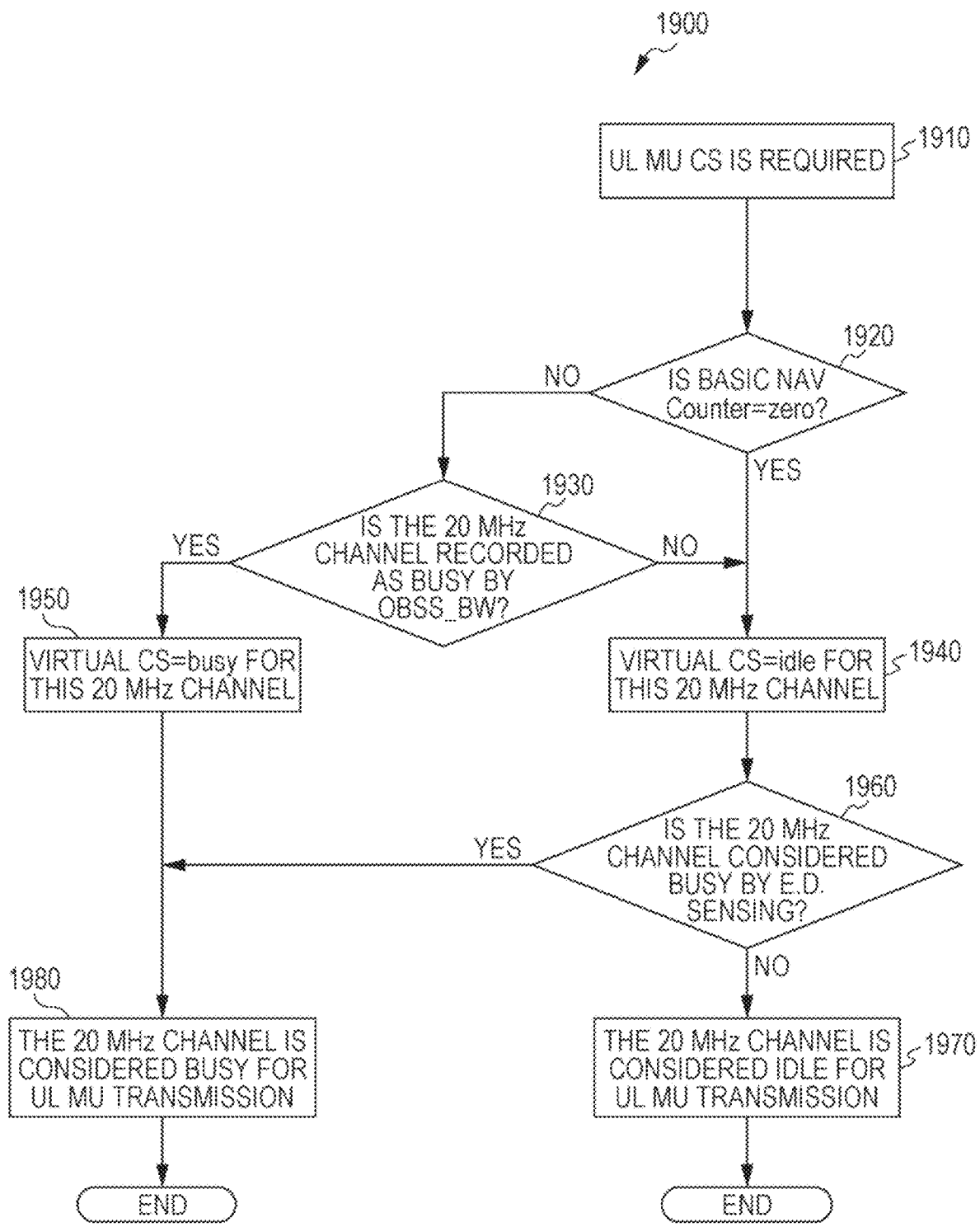
FIG. 19 is a flowchart illustrating the rule for the multi-channel UL MU CS mechanism as per the third embodiment.

FIG. 19 depicts a flow chart 1900 that explains the UL MU CS transmission rule as per the third embodiment when the virtual CS rule is indicated per 20 MHz channel by maintaining the OBSS transmission bandwidth information in OBSS_BW. For each of the 20 MHz channel of the wide-band channel on which a STA has been allocated an RU for uplink transmission by the AP in a Trigger frame with CS Required field set to 1, the UL MU CS process starts at step 1910. Since the CS Required field is set to 1 in the Trigger frame, before transmitting a HE trigger-based PPDU the STA is required to perform UL MU CS at least on all the 20 MHz channels containing the allocated RU during the SIFS time immediately after the end of the PPDU containing the trigger frame.

At step 1920, the basic NAV duration counter is checked and if it is zero the process proceeds to step 1940, else the process moves to step 1930. At step 1930, if the 20 MHz channel is recorded as busy by OBSS_BW, the process moves to step 1950, else it moves to step 1940. At step 1940, the virtual CS reports the 20 MHz channel as idle and the process moves to step 1960. At step 1950, the virtual CS reports the 20 MHz channel as busy and the process moves to step 1980. At step 1960, the STA sense the wireless medium using energy-detect (ED) during the SIFS time immediately after the end of the PPDU containing the trigger frame and if the channel is sensed to be busy, the process moves to step 1980, else the process moves to step 1970.

At step 1980, the 20 MHz channel is considered busy for UL MU transmission and the process ends for this 20 MHz channel. At step 1970, the 20 MHz channel is considered idle for UL MU transmission and the process ends for this 20 MHz channel. The process 1900 is repeated at least for each of the 20 MHz channel of the wide-band channel on which the STA has been allocated an RU for uplink transmission. If all the 20 MHz channels containing the RU allocated in the trigger frame to the STA are considered idle, the STA may transmit its HE trigger-based PPDU.

Referring to FIG. 20, table 2000 lists various parameters from which a STA, that receives a valid NAV setting IEEE 802.11 PPDU, may determine the channel bandwidth information of the PPDU. As per the IEEE 802.11 specification, upon receiving a valid IEEE 802.11 PHY preamble, the PHY layer of the STA measures the received signal strength level and if the signal strength level is above a certain threshold, generally called the Preamble Detect (PD) level, the PHY indicates this to the MAC layer via PHY-CCA.indication (BUSY, primary) primitive. The STA continues to receive the rest of the PHY header fields and if the PHY header reception is successful, the PHY layer issues a PHY-RXSTART.indication (RXVECTOR) primitive to the MAC.

The content of the RXVECTOR depends on the format of the received PPDU, and the STA determines the bandwidth of the received PPDU based on the relevant parameters of RXVECTOR as listed in table 2000. If the received PPDU is a HE PPDU, the bandwidth is indicated by the CH_BANDWIDTH parameter. The CH_BANDWIDTH parameter in turn is based on the Bandwidth field in the HE-SIG-A of the PHY header of the received HE PPDU. If the received PPDU is a VHT PPDU, the bandwidth is also indicated by the CH_BANDWIDTH parameter. The CH_BANDWIDTH parameter in turn is based on the Bandwidth field in the VHT-SIG-A1 of the PHY header of the received VHT PPDU.

If the received PPDU is a HT PPDU, the bandwidth is also indicated by the CH_BANDWIDTH parameter. The CH_BANDWIDTH parameter in turn is based on the CBW 20/40 bit in the HT-SIG of the PHY header of the received HT PPDU. However, if the received PPDU is a non-HT PPDU, determining the exact bandwidth of the PPDU is more complicated since a non-HT PPDU can be in a legacy non-HT PPDU format or may be in a non-HT duplicate PPDU format. The PPDU format of a non-HT PPDU can be determined by referring to the NON_HT_MODULATION parameter of RXVECTOR. If the NON_HT_MODULATION parameter is OFDM, the PPDU is a legacy non-HT PPDU and the channel bandwidth is equal to 20 MHz.

However, if the NON_HT_MODULATION parameter is NON_HT_DUP_OFDM, the PPDU is a non-HT duplicate PPDU, i.e. the same PPDU is duplicated on multiple 20 MHz channels. In this case, the CH_BANDWIDTH parameter only indicates the estimated channel bandwidth. However, the non-HT duplicate PPDU may be transmitted by a bandwidth signaling STA i.e. the Transmitter Address (TA) field of the MAC header contained in the received PPDU is a bandwidth signaling TA (Individual/Group bit of the TA is 1). In such case, the exact bandwidth of the PPDU can be determined by further referring to the CH_BAND-WIDTH_IN_NON_HT parameter of the RXVECTOR. In some cases, it may not be possible to determine the exact bandwidth of the non-HT duplicate PPDU, for example, CTS frame is usually transmitted in non-HT PPDU or non-HT duplicate PPDU format to ensure maximum NAV protection against legacy devices.

Since CTS frame does not even contain a TA field, it is not possible to determine the exact bandwidth covered by the CTS frame if it is transmitted in the non-HT duplicate format. If such a PPDU is received and the STA is unable to determine the exact bandwidth of the PPDU, as per the third embodiment, the OBSS_BW information field is set such that all of the STAs operation channels are recorded as busy so as to disallow the STA's transmission when the basic NAV duration counter is non-zero. This ensures that the STA does not inadvertently cause interference to ongoing OBSS transmissions.

Referring to FIG. 21, table 2100 lists the possible values and the meanings of the channel-list parameter of the PHY-CCA.indication primitive issued by HE STAs. In addition to the four existing members of the channel-list parameter, namely primary, secondary, secondary40 and secondary80, HE STAs may optionally also include the per20 MHz bitmap, where each bit of the bitmap equal to 0 indicates an idle 20 MHz channel and each bit equal to 1 indicates a busy 20 MHz channel. If the PHY layer of the HE STA has the capability to indicate the channel status in such 20 MHz granularity, the STA may alternatively also use the per20 MHz bitmap to set the OBSS_BW information field.

<Fourth Embodiment>

As mentioned earlier, sometimes it may not be possible for a STA to determine the exact bandwidth of a received PPDU, or a STA may choose not to record the bandwidth information of the received PPDUs for ease of implementation or any other reasons. At other times, even though the PPDU that sets the NAV only occupies the primary 20 MHz channel, the STA may possess other information that indicates that transmitting on the non-primary channels may not be advisable during the NAV duration.

Similarly, it may also be possible that even though a STA may not be able to determine the exact bandwidth of a received PPDU, based on its historic knowledge of the neighboring OBSSs, the STA may still be able to accurately predict the bandwidth of the PPDU. For example, based on previously received OBSS frames, a STA may be aware that a certain OBSS only operates on the 20 MHz primary channel, or that a certain HE STA is a 20 MHz only device (based on frames received during capability exchange between the STA and its AP). The STA may have built up such a knowledge base of its neighborhood over time, and when a PPDU is received, based on some relevant fields in the PPDU such as the Basic Service Set Identifier (BSSID), or the Transmitter/Receiver Address etc., the STA may be able to decide whether or not its transmission on the non-primary channels during the NAV period (i.e. the duration during which the NAV duration counter is non-zero) is harmless.

As per the fourth embodiment, instead of recording the bandwidth information of a NAV setting PPDU, a STA maintains a flag, TX_Allowed, which indicates whether or not the STA may transmit on the non-primary 20 MHz channels during the NAV period. The TX_Allowed flag may be maintained independent of the NAV or it may also be tightly tied to the NAV.

Referring to FIG. 22, 2200 illustrates the NAV maintained by a STA as per the fourth embodiment using two octets. As per the IEEE 802.11 specification, in most cases, a STA updates its NAV based on the content of the 2-octet Duration/ID field in the MAC header of a valid 802.11 frames. When used to carry the Duration value, Bit 15 of the Duration/ID field is set to 0, while the remaining 15 bits carry the duration value in microseconds. In some cases, a HE STA may also use the 7-bits TXOP_DURATION parameter in the RXVECTOR to update the NAV. In either case, 15 bits are enough to record the NAV duration as illustrated by 2210.

The last bit, B15, is used as the TX_Allowed flag 2220. The encoding of the TX_Allowed flag is explained in table 2230. When the TX_Allowed flag is set to zero, the STA is not allowed to transmit when the NAV duration field 2210 indicates a non-zero value. When it is set to one, the STA may transmit on the non-primary 20 MHz channels during the NAV period if permitted by other conditions (for example if the energy detect (ED) based channel sensing also returns the non-primary 20 MHz channel as idle).

Figure 23:
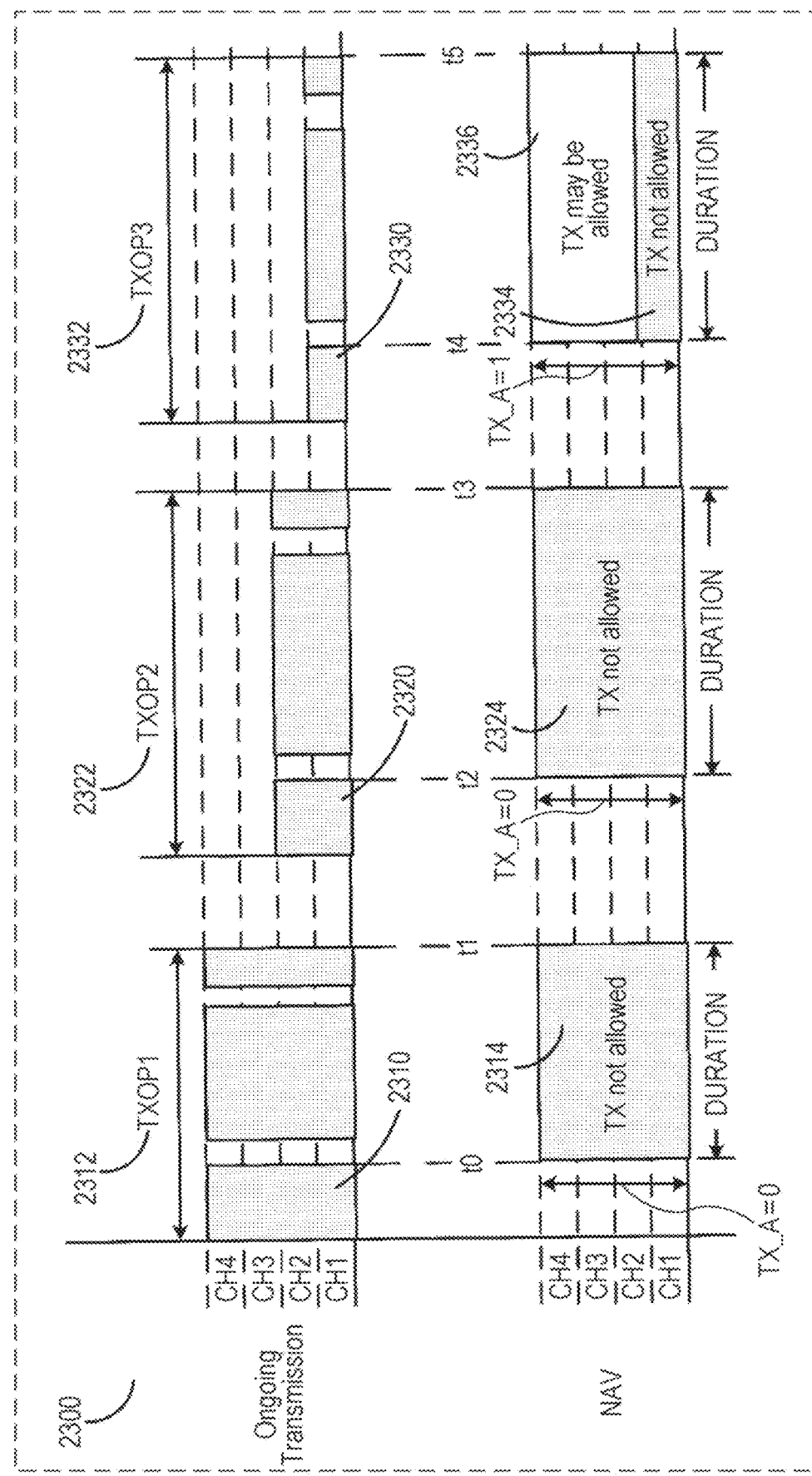
FIG. 23 is an example of frame exchange sequences illustrating the multi-channel virtual carrier sensing (CS) as per the fourth embodiment.

Referring to FIG. 23, a series of example frame exchange sequences 2300 are shown to provide a visual illustration of the recording of the NAV as per the fourth embodiment in an 80 MHz BSS.

The top portion of FIG. 23 depicts three transmission sequences with variable bandwidths: an 80 MHz TXOP1 2312, a 40 MHz TXOP2 2322 and a 20 MHz TXOP3 2332. Time points relevant to this example are denoted by t0, t1, t2, t3, t4 and t5. Any STA that is within the radio coverage of an ongoing transmission and is neither a transmitter nor an intended recipient of the transmission is considered a third party STA for that transmission.

Upon receiving the first PPDU 2310 of TXOP1 2312, a third party STA determines that the third party STA itself is not an intended recipient of the PPDU 2310, for example, by reading the receiver address in the MAC header of the frames carried by the PPDU, or by reading the AID12 subfield of the User Info field of the Trigger frame carried in the PPDU 2310 etc. Once the STA has determined that the STA itself is not a recipient of the PPDU 2310, as per the existing NAV rule, it copies the protection duration from the relevant fields of PPDU 2310 and sets the NAV duration 2210, for example to time duration from time t0 to time t1.

In addition to recording the NAV duration, as per the fourth embodiment, the STA also makes a prediction whether transmissions on the other 20 MHz channels within its operation bandwidth aside from the primary 20 MHz channel is permissible. The STA may make use of such information as the bandwidth of the PPDU 2310, its historic knowledge of the neighboring OBSSs, relevant fields in the PPDU such as the Basic Service Set Identifier (BSSID), or the Transmitter/Receiver Address etc. to decide whether or not its transmission on the non-primary channels during the NAV duration is harmless.

In the case of PPDU 2310, the STA predicts that it is not advisable to transmit on the other non-primary 20 MHz channels during the NAV period, t0 to t1, due to high risk of interference to the subsequent transmissions of TXOP1 2312 on CH2, CH3 and CH4 and hence it sets the TX_Allowed flag 2200 to 0. This is visually illustrated by the box 2314. Similarly, upon receiving PPDU 2320, the STA sets the NAV duration to time duration from time t2 to time t3 which is the end of TXOP2 2322. In this case too, the STA predicts that it is not advisable to transmit on the other non-primary 20 MHz channels during the NAV period, t2 to t3, due to the risk of interference to the subsequent transmissions of TXOP1 2322 on CH2 and hence it sets the TX_Allowed flag 2200 to 0. This is illustrated as the box 2324.

In the same way, upon receiving the PPDU 2330, the STA sets the NAV duration to time duration from time t4 to time t5 which is the end of TXOP3 2332. At this time though, the STA predicts that its transmission on the non-primary 20 MHz channels CH2, CH3 and CH4 during the NAV period does not interfere with the subsequent transmissions of TXOP3 2332 and hence it sets the TX_Allowed flag 2200 to 1 indicating that the STA may transmit on the non-primary 20 MHz channels during the NAV period, t4 to t5, if permitted by other conditions. This is visually illustrated by the box 2336. However, transmission on the primary 20 MHz channel CH1 is prohibited during the NAV period as visually indicated by the box 2334. At time t5, when the NAV duration counter becomes zero, the TX_Allowed flag is also reset to zero.

Figure 24:
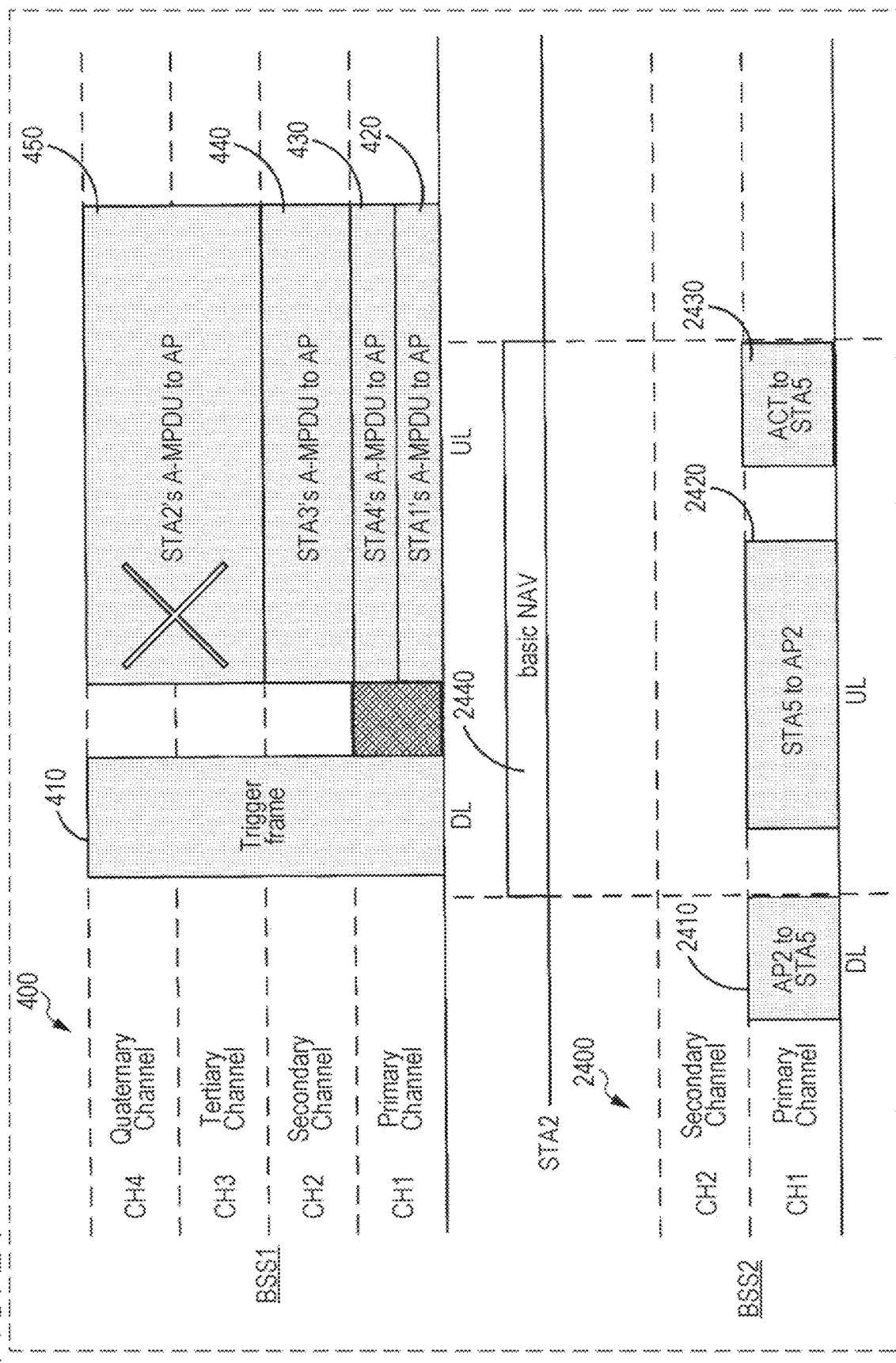
FIG. 24 is another diagram illustrating the technical problem addressed in the present disclosure to better highlight the improvements made by the fourth embodiment.

FIG. 24 illustrates the example UL MU transmission sequence 400 in yet another channel condition to highlight the spectrum reuse improvement made by the fourth embodiment. At the moment when the STAs receive the Trigger frame 410 from the AP1 (101 in FIG. 1), there are no ongoing transmissions within the radio coverage area of STA1, STA3 and STA4 on the primary 20 MHz channel and both the intra-BSS NAV and the basic NAV of STA1, STA3 and STA4 are set to zero. However there is an ongoing OBSS transmission in BSS2 (145 in FIG. 1), within STA2's radio coverage area, on the primary channel CH1 as illustrated by the transmission sequence 2400.

AP2 (102) and STA5 (150) are engaged in a two way frame exchange using the reverse direction protocol (RDP). AP2 transmits the PPDU 2410 that includes the RDP A-Control field with the Reverse Direction Grant (RDG)/More PPDU field set to 1 to STA5. And the STA5 replies with PPDU 2420 at a time SIFS after the end of PPDU 2410. AP2 ends the frame exchange by transmitting the ACK frame 2430 to STA5.

Upon receiving PPDU 2410, STA2 determines that it is an OBSS PPDU and sets its basic NAV till the end of transmission sequence 2400. The illustrated OBSS interference to STA2 is slightly different as compared to that illustrated in FIG. 5; OBSS transmission only interferes on the primary 20 MHz channel CH1. However, under the original UL MU CS rule, the effect of the interference on STA2 is exactly the same. Since the basic NAV is non-zero, the virtual CS returns busy and even though the energy detect returns idle on channels CH3 and CH4, STA2 is not allowed to transmit the HE trigger-based PPDU 450 on the allocated RU on channels CH3 and CH4.

As per the fourth embodiment, the virtual CS rule is modified such that the busy/idle virtual CS state is considered differently for different 20 MHz channel. At the very least, the virtual CS is considered differently for the primary 20 MHz channel and the rest of the non-primary 20 MHz channels within a STA's operating bandwidth. When the basic NAV duration counter is non-zero, the primary 20 MHz channel is always indicated as busy by the virtual CS. However whether the non-primary 20 MHz channels are considered as idle or busy by virtual CS depend on the TX_Allowed flag. When the TX_Allowed flag is not set, i.e., the TX_Allowed bit 2220 is 0, all the non-primary 20 MHz channels are also indicated as busy. However, when TX_Allowed flag is set, i.e., the TX_Allowed bit 2220 is 1, all the non-primary 20 MHz channels are indicated as idle.

Figure 25:
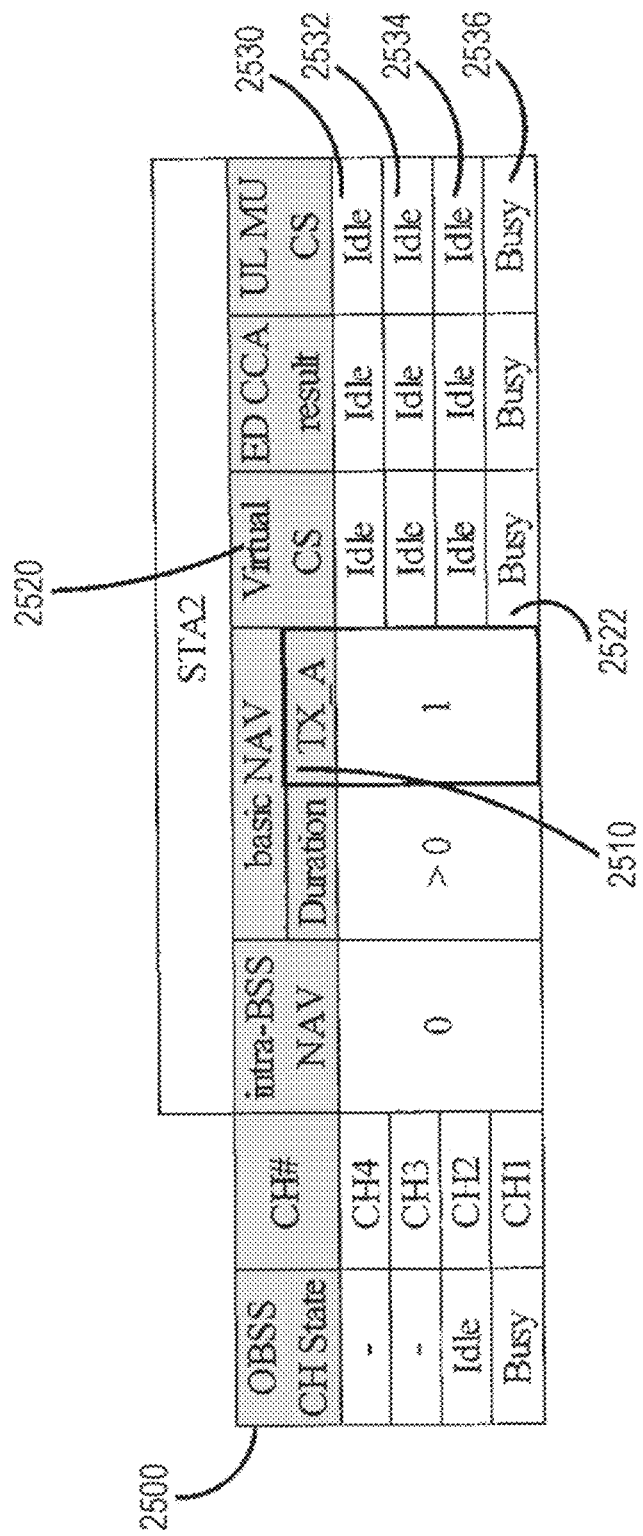
FIG. 25 is a table illustrating how the various parameters related to the UL MU CS mechanism are updated based on the modified multi-channel virtual CS rule as per the fourth embodiment.

The table 2500 in FIG. 25 lists the various parameters related to the modified UL MU CS mechanism as per the fourth embodiment for STA2 during the UL MU transmission sequence 400 shown in FIG. 24. Table 2500 and its content is almost the same as that of table 880 in FIG. 8B except that CH2 is idle and instead of maintaining the busy/idle state of each 20 MHz channel by recording the bandwidth information of the PPDU that sets the basic NAV, just the TX_Allowed flag is maintained as shown by the abbreviation TX A 2510. Upon receiving the PPDU 2410, based on the relevant fields from the PPDU such as BSS Color, CH_BANDWIDTH parameter of RXVECTOR, STA2 determines that it is an inter-BSS 20 MHz PPDU. STA2 may also have historical information that BSS2 only operates on 20 MHz and based on the BSS Color or the BSSID of the frame contained in PPDU 2410, STA2 can reliably predict that, during the NAV period, the OBSS transmission 2400 will be limited to the primary 20 MHz channel CH1. As such, STA2 determines that it is safe for it to transmit its UL MU PPDUs on the non-primary channels during the NAV period and hence it sets the TX_Allowed bit 2200 to 1.

According to the virtual CS rule as per the fourth embodiment, CH1 is indicated as busy 2522 but since the TX_Allowed bit 2200 is equal to 1, the non-primary channels CH2, CH3 and CH4 are indicated as idle by the virtual CS. Similarly, when STA2 performs the energy detect (ED) based CCA during the SFS after the PPDU 410 containing the trigger frame, CH1 is indicated busy while the three non-primary channels CH2, CH3 and CH4 are indicated as idle. The UL MU CS mechanism considers the status of both virtual CS as well as energy detect sensing and indicates CH1 as busy while CH2, CH3 and CH4 are considered as idle as indicated by the entries 2536, 2534, 2532 and 2530 respectively. Since both CH3 and CH4 are considered idle, as per the modified UL MU CS transmission rule, STA2 is allowed to transmit its UL PPDU 450 on the allocated RU on CH3 and CH4 thereby promoting more efficient use of the wireless medium.

The virtual CS rule as per the fourth embodiment can be summarized as below:
  For each 20 MHz channel containing the allocated RU for the STA's uplink transmission, a NAV is considered in virtual CS for a STA that is solicited by a Trigger frame for transmission unless one of the following conditions is met:
  The NAV was set by an intra-BSS frame
  The NAV duration counter is zero
  The 20 MHz channel is not the primary 20 MHz channel and the TX_Allowed flag is set to 1.
  If no NAV is considered, then the virtual CS indicates idle for the 20 MHz channel, else the virtual CS indicates busy for the 20 MHz channel.

The UL MU CS rule as per the fourth embodiment can be summarized as below:

If the CS Required subfield in the Trigger frame is set to 1, during the SIFS time after the Trigger frame, at least for each 20 MHz channel containing the allocated RU for the STA's UL MU transmission, the STA shall consider the status of the CCA using the appropriate energy detect (ED) rule as well as the virtual CS before UL MU transmission in response to the Trigger frame. The STA may transmit a HE trigger-based PPDU when the 20 MHz channels containing the allocated RUs in the Trigger frame are considered idle; if the STA detects that the 20 MHz channels containing the allocated RUs are not all idle, then the STA shall not transmit anything in the allocated RUs.

Figure 26:
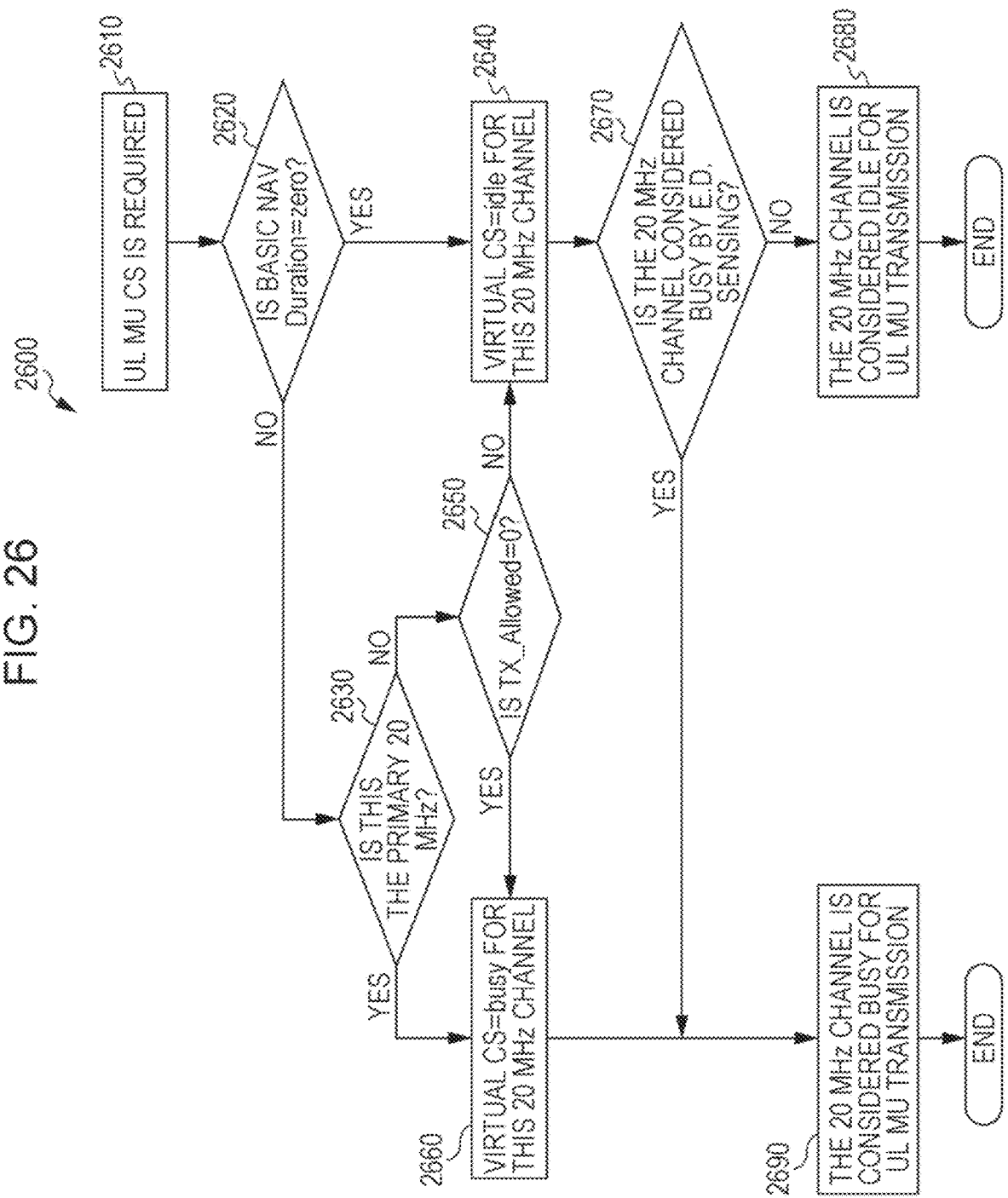
FIG. 26 is a flowchart illustrating the rule for the multi-channel UL MU CS mechanism as per the fourth embodiment.

FIG. 26 depicts a flow chart 2600 that explains the UL MU CS transmission rule as per the fourth embodiment. For each of the 20 MHz channel of the wide-band channel on which a STA has been allocated an RU for uplink transmission by the AP in a Trigger frame with CS Required field set to 1, the UL MU CS process starts at step 2610. Since the CS Required field is set to 1 in the Trigger frame, before transmitting a HE trigger-based PPDU the STA is required to perform UL MU CS at least on all the 20 MHz channels containing the allocated RU during the SIFS time immediately after the end of the PPDU containing the trigger frame. At step 2620, the basic NAV duration counter is checked and if it is zero the process proceeds to step 2640, else the process moves to step 2630.

At step 2630, if the 20 MHz channel is the primary 20 MHz channel, the process moves to step 2660, else it moves to step 2650. At step 2650, if the TX_Allowed flag is set to 0, the process moves to step 2660, else it moves to step 2640. At step 2640, the virtual CS reports the 20 MHz channel as idle and the process moves to step 2670. At step 2660, the virtual CS reports the 20 MHz channel as busy and the process moves to step 2690.

At step 2670, the STA sense the wireless medium using energy-detect (ED) during the SIFS time immediately after the end of the PPDU containing the trigger frame and if the channel is sensed to be busy, the process moves to step 2690, else the process moves to step 2680. At step 2690, the 20 MHz channel is considered busy for UL MU transmission and the process ends for this 20 MHz channel. Similarly, at step 2670, the 20 MHz channel is considered idle for UL MU transmission and the process ends for this 20 MHz channel. The process 2600 is repeated at least for each of the 20 MHz channel of the wide-band channel on which the STA has been allocated an RU for uplink transmission. When all the 20 MHz channels containing the RU allocated in the trigger frame to the STA are considered idle, the STA may transmit its HE trigger-based PPDU on the allocated RU.

Figure 27:
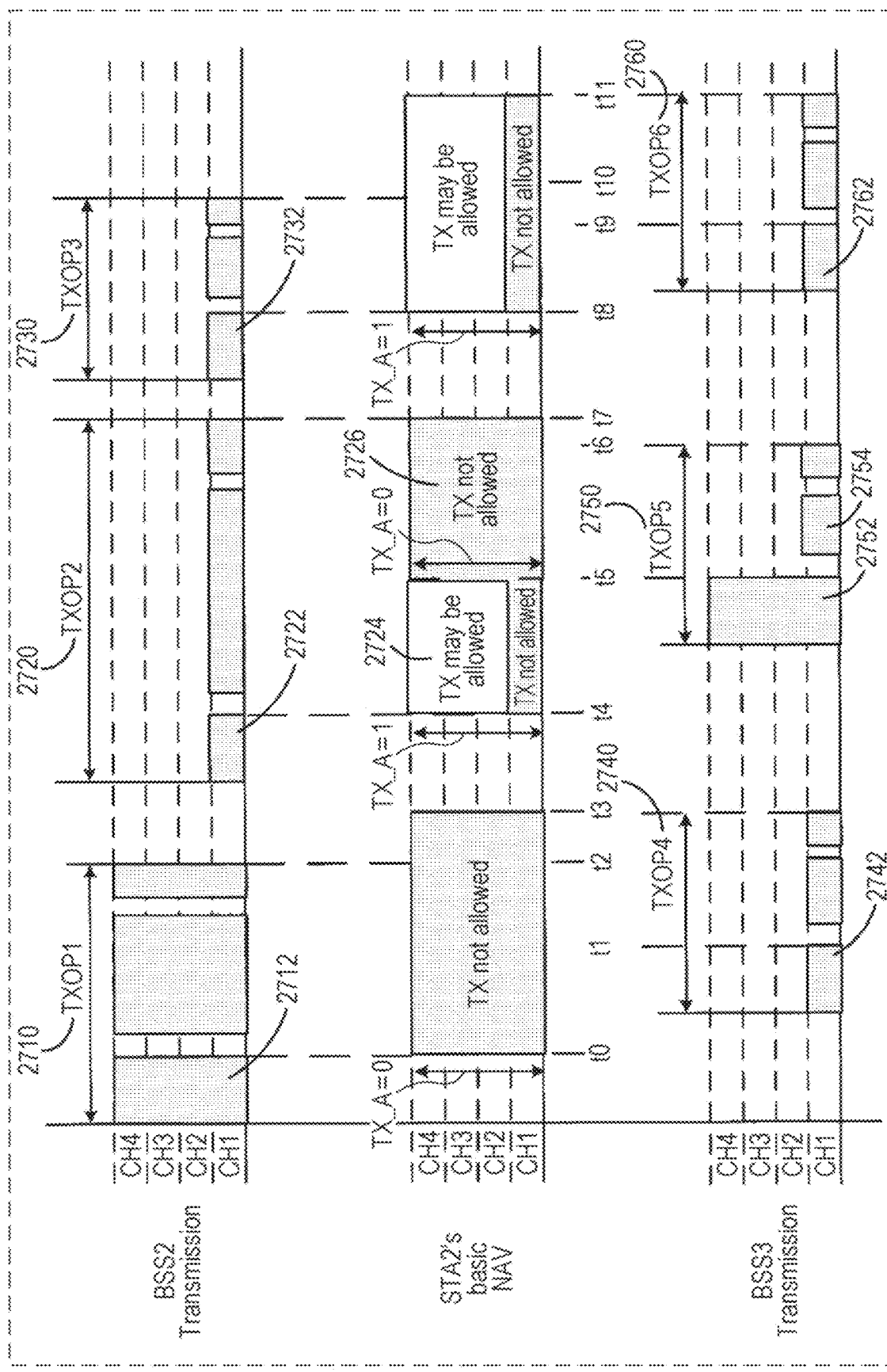
FIG. 27 is an example of frame exchange sequences illustrating the basic NAV update rule in the presence of multiple OBSSs as per the fourth embodiment.

Referring to FIG. 27, a series of example frame exchange sequences are shown to provide a visual illustration of update rules for the TX_Allowed flag when there are multiple OBSSs within a STA's radio coverage, for example in the BSS layout shown in FIG. 9, assuming that all three BSSs, BSS1 100, BSS2 145 and BSS3 900 are 80 MHz BSSs. Three transmission sequences of different bandwidths in BSS2 145 are depicted at the top portion of FIG. 27: an 80 MHz TXOP1 2710 and two 20 MHz TXOPs: TXOP2 2720 and TXOP3 2730. Similarly, three transmission sequences of different bandwidths in BSS3 900 are depicted at the bottom portion of FIG. 27: two 20 MHz TXOPs: TXOP4 2740, TXOP6 2760 and a variable bandwidth TXOP5 2750. The middle portion of FIG. 27 depicts the visual illustration of the basic NAV maintained by STA2 120 as proposed by the fourth embodiment. The points in time relevant to this example are denoted by t0, t1, t2, t3, t4, t5, t6, t7, t8, t9, t10 and t11.

Upon receiving the first PPDU 2712 of the TXOP1 2710, based on the BSS Color field in the PHY header or the BSSID field in the MAC header, STA2 determines that PPDU 2712 is an OBSS PPDU from BSS2 and that STA2 is not one of the recipient of the PPDU. As per the existing NAV rule for updating the NAV duration, STA2 sets the basic NAV duration from time t0 to time t2. At the same time, based on its prediction of future OBSS transmission during the NAV period, STA2 sets the TX_Allowed flag to 0.

Upon receiving the first PPDU 2742 of TXOP4 2740, STA2 determines that 2742 is an OBSS PPDU from BSS3 and that STA2 is not one of the recipient of the PPDU. Since the duration indicated in PPDU 2742 is longer than the existing NAV duration, as per the rule for updating the NAV duration, STA2 updates the NAV duration until time t3, the end of TXOP4 2740. Even though STA2 determines that the bandwidth of TXOP4 2740 is only 20 MHz, based on its knowledge of BSS2 transmission sequence 2710, STA2 decides that transmission should be continued to be prohibited on the non-primary channels during the extended NAV period and hence it makes no changes to the TX_Allowed flag.

Similarly, upon receiving the first PPDU 2722 of the TXOP2 2720, since STA2 is not one of the recipient of the PPDU, STA2 sets the NAV duration from time t4 to time t7. STA2 determines that the bandwidth of TXOP2 2720 is only 20 MHz and sets the TX_Allowed flag to 1 indicating that transmission may be permitted on the non-primary 20 MHz channels during the NAV period.

Upon receiving the first PPDU 2752 of TXOP5 2750, STA2 determines that 2752 is an OBSS PPDU from BSS3 and it is not one of the recipient of the PPDU. Since the duration indicated in 2752 is shorter than the existing NAV duration, as per the NAV rule for updating the NAV duration, STA2 does not update the NAV duration. However, since the bandwidth of PPDU 2752 is wider than 20 MHz, STA2 predicts risk of interference to OBSS from transmission on the non-primary channels and hence updates the TX_Allowed flag to 0, prohibiting initiation of new transmission on the non-primary channels during the rest of the NAV period. However, based on some fields of the PPDU 2752, or its prior knowledge of BSS3 (for example that PPDU 2752 contains a frame seeking response only from a HE 20 MHz-only device i.e. a device that has the capability to operate only on the primary 20 MHz channel), if STA2 is able to determine that the bandwidth of TXOP5 will be reduced to 20 MHz, STA2 may also choose not to update the TX_Allowed flag thereby continuing to allow transmissions in the non-primary 20 MHz channels during the NAV period.

Similarly, upon receiving the first PPDU 2732 of the TXOP3 2730, since STA2 is not one of the recipient of the PPDU, STA2 sets the NAV duration from time t8 to time t10. STA2 also determines that the bandwidth of TXOP3 2730 is only 20 MHz and sets the TX_Allowed flag to 1 indicating that transmission may be permitted during the NAV period.

Upon receiving the first PPDU 2762 of TXOP6 2760, STA2 determines that 2762 is an OBSS PPDU from BSS3 and it is not one of the recipient of the PPDU. Since the duration indicated in PPDU 2762 is longer than the existing NAV duration, as per the rule for updating the NAV duration, STA2 updates the NAV duration until time t11, the end of TXOP6 2760. Since the bandwidth of TXOP6 2760 is also only 20 MHz, STA2 chooses not to update the TX_Allowed flag thereby continuing to allow transmissions in the non-primary 20 MHz channels during the NAV period. At time t11, when the NAV duration counter reaches zero, STA2 resets the TX_Allowed flag to zero.

Figure 28:
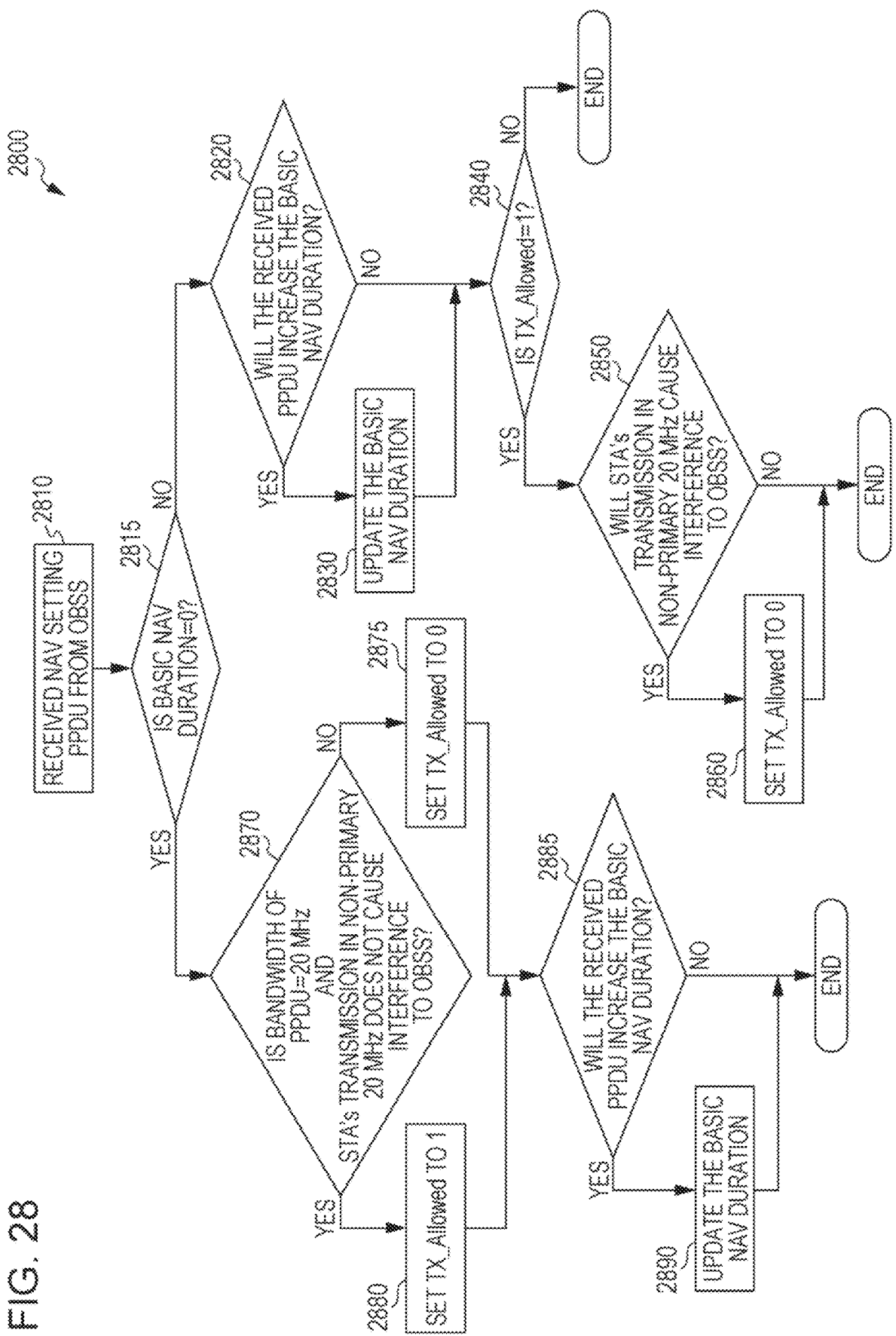
FIG. 28 is a flowchart illustrating the basic NAV update rule in the presence of multiple OBSSs as per the fourth embodiment.

The update rule for the TX_Allowed flag is summarized by the flow chart 2800 in FIG. 28. The process starts at step 2810 when a NAV setting OBSS PPDU is received. At step 2815, if the current value of the basic NAV duration is equal to zero, the process moves to step 2870, else it moves to step 2820.

At step 2820, if the PPDU causes the NAV duration of the basic NAV to increase, the process moves to step 2830, else the process moves to step 2840. At step 2830, the basic NAV duration is updated according to the relevant duration information in the PPDU (e.g. based on the TXOP duration field in the PHY header, or the duration field in the MAC header) and the process moves to step 2840. At step 2840, if the TX_Allowed flag is equal to 1, the process moves to step 2850 else the process ends.

At step 2850, the STA determines if its transmission on the non-primary 20 MHz channels may cause interference to OBSS transmission and if Yes, the process moves to step 2860, else the process ends. At step 2860, the STA sets TX_Allowed flag to 0 and the process ends.

At step 2870, if the bandwidth of the received PPDU is equal to 20 MHz and the STA determines that its transmission on the non-primary 20 MHz channels will not cause interference to OBSS transmission the process moves to step 2880, else the process moves to step 2875. At step 2880, the STA sets TX_Allowed flag to 1 and the process moves to step 2885. At step 2875, the STA sets TX_Allowed flag to 0 and the process moves to step 2885. At step 2885, if the PPDU causes the NAV duration of the basic NAV to increase, the process moves to step 2890, else the process ends. At step 2890, the basic NAV duration is updated according to the relevant duration information in the PPDU (e.g. based on the TXOP duration field in the PHY header, or the duration field in the MAC header) and the process ends.

It is needless to say that Configuration of a STA described above using FIGS. 15 and 16 can implement the above mentioned third and fourth embodiments of the present disclosure.

In the foregoing embodiments, the present disclosure is configured with hardware by way of example, but may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

This disclosure can be applied to a wireless apparatus for an efficient virtual carrier sensing (CS) in a multi-channel wireless communication system.

What is claimed is:

1. A communication apparatus comprising:
   circuitry which, in operation:
      performs an energy detection in a part of an operating channel after receiving, from an access point (AP), a physical layer protocol data unit (PPDU) that contains a trigger frame allocating a resource of a trigger based (TB) PPDU wherein the part of the operating channel contains the allocated resource; and
      sets during Short InterFrame Space (SIFS) after receiving the PPDU that contains the trigger frame, based on the energy detection, a per20 MHz bitmap indicating a busy or idle state of each of 20 MHz sub-channels including a primary channel and a second and a secondary channel in the operating channel wherein the primary channel is a common channel for all stations in a basic service set; and
   a transmitter, which, in operation and in response to the trigger frame, transmits, to the AP, the TB PPDU after the SIFS by using the allocated resource on the secondary channel when the per20 MHz bitmap indicates that the secondary channel in the detected part of the operating channel is idle, regardless of whether the primary channel is busy or idle.

2. The communication apparatus according to claim 1, wherein the transmitter does not transmit the TB PPDU on the primary channel.

3. The communication apparatus according to claim 1, wherein the trigger frame contains a carrier sensing (CS) required subfield indicating that the energy detection is required.

4. The communication apparatus according to claim 1, wherein the per20 MHz bitmap is 8-bit bitmap information.

5. The communication apparatus according to claim 1, wherein the circuitry maintains a network allocation vector (NAV), and determines whether to respond to the trigger frame based on the NAV.

6. The communication apparatus according to claim 5, wherein the circuitry determines whether to respond to the trigger frame based on whether or not a PPDU used for updating the NAV is transmitted from a basic service set (BSS) to which the communication apparatus belongs.

7. A communication method, comprising:
   performing an energy detection in a part of an operating channel after receiving, from an access point (AP), a physical layer protocol data unit (PPDU) that contains a trigger frame allocating a resource of a trigger based (TB) PPDU wherein the part of the operating channel contains the allocated resource;
   setting during Short InterFrame Space (SIFS) after receiving the PPDU that contains the trigger frame, based on the energy detection, a per20 MHz bitmap indicating a busy or idle state of each of 20 MHz sub-channels including a primary channel and secondary channel in the operating channel wherein the primary channel is a common channel for all stations in a basic service set; and
   in response to the trigger frame, transmitting, to the AP, the TB PPDU after the SIFS by using the allocated resource on the secondary channel when the per20 MHz bitmap indicates that the secondary channel in the detected part of the operating channel is idle, regardless of whether the primary channel is busy or idle.

* * * * *

UNITED STATES PATENT AND TRADEMARK OFFICE
CERTIFICATE OF CORRECTION

| | |
|---|---|
| PATENT NO. | : 11,533,755 B2 |
| APPLICATION NO. | : 16/285965 |
| DATED | : December 20, 2022 |
| INVENTOR(S) | : Rojan Chitrakar et al. |

Page 1 of 1

It is certified that error appears in the above-identified patent and that said Letters Patent is hereby corrected as shown below:

In the Claims

Column 30, Claim 1, Lines 20-21:
"channel and a second and a secondary channel" should read: --channel and a secondary channel--.

Signed and Sealed this
Twenty-fourth Day of January, 2023

Katherine Kelly Vidal
*Director of the United States Patent and Trademark Office*